US008730438B2

(12) United States Patent
Jung et al.

(10) Patent No.: US 8,730,438 B2
(45) Date of Patent: May 20, 2014

(54) LIQUID CRYSTAL DISPLAY PANEL WITH MULTI-DOMAIN UNIT PIXELS AND AN OPTICAL MASK FOR MANUFACTURING THE SAME

(75) Inventors: Jin-Soo Jung, Hwaseong-si (KR); Kyoung-Ju Shin, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 500 days.

(21) Appl. No.: 13/005,700

(22) Filed: Jan. 13, 2011

(65) Prior Publication Data

US 2012/0026439 A1    Feb. 2, 2012

(30) Foreign Application Priority Data

Jul. 30, 2010    (KR) .......................... 10-2010-0074249
Dec. 30, 2010    (KR) .......................... 10-2010-0139663

(51) Int. Cl.
*G02F 1/1337* (2006.01)
(52) U.S. Cl.
USPC .......................................... 349/129; 349/128
(58) Field of Classification Search
None
See application file for complete search history.

(56) References Cited

U.S. PATENT DOCUMENTS 6,469,763 B2 * 10/2002 Kim et al. ..................... 349/124
7,215,397 B2 * 5/2007 Inoue et al. ................... 349/129

2010/0157220 A1    6/2010 Shin et al.
2010/0225864 A1    9/2010 Inoue et al.
2011/0043741 A1    2/2011 Hirato

FOREIGN PATENT DOCUMENTS

| EP | 0549283 | 6/1993 |
| JP | 07-209850 | 8/1995 |
| JP | 2999955 | 11/1999 |
| JP | 2004-199030 | 7/2004 |
| JP | 2008-076825 | 4/2008 |
| WO | 2007086474 | 8/2007 |
| WO | 2009130908 | 10/2009 |

OTHER PUBLICATIONS

European Search Report dated May 7, 2012 in corresponding European Appln. No. 11000722.6-2205.

* cited by examiner

*Primary Examiner* — Richard Kim
(74) *Attorney, Agent, or Firm* — F. Chau & Associates, LLC

(57) ABSTRACT

A liquid crystal display panel, including a unit pixel including a first substrate having a first alignment film, a second substrate having a second alignment film spaced apart from and facing the first alignment film, and a liquid crystal layer interposed between the first alignment film and the second alignment film; and first and second adjacent domains, each of which includes a domain boundary region defining part of an area between the adjacent domains, and a normal-luminance region adjacent to the domain boundary region, wherein pretilt angles of liquid crystal molecules near the first alignment film in the domain boundary regions are greater than pretilt angles of liquid crystal molecules near the first alignment film in the normal-luminance regions.

14 Claims, 24 Drawing Sheets

| POSITION\INDEX | 1 | 2 | 3 | 4 | 5 |
|---|---|---|---|---|---|
| FRONT | GOOD | GOOD | GOOD | SLIGHTLY POOR | LITTLE POOR |
| SIDE | GOOD | SLIGHTLY POOR | LITTLE POOR | LITTLE POOR | LITTLE POOR |

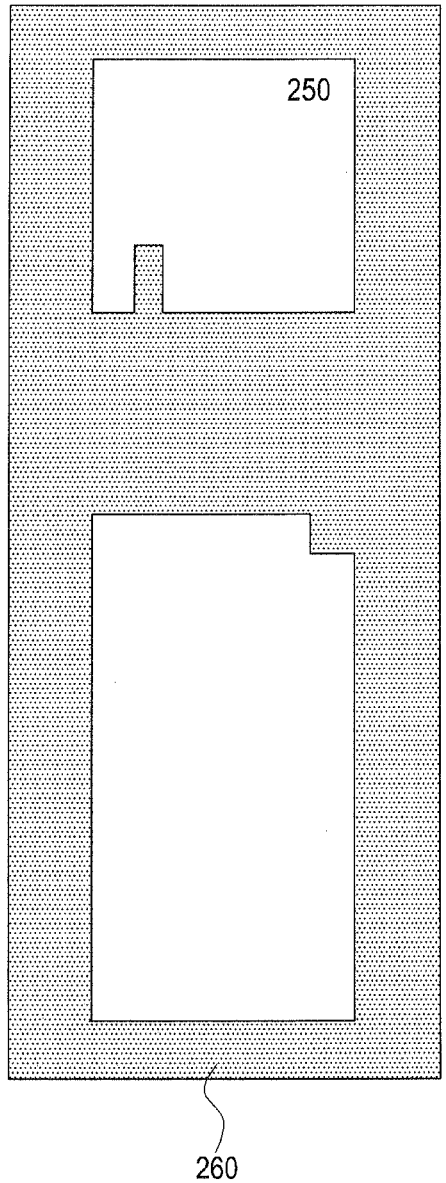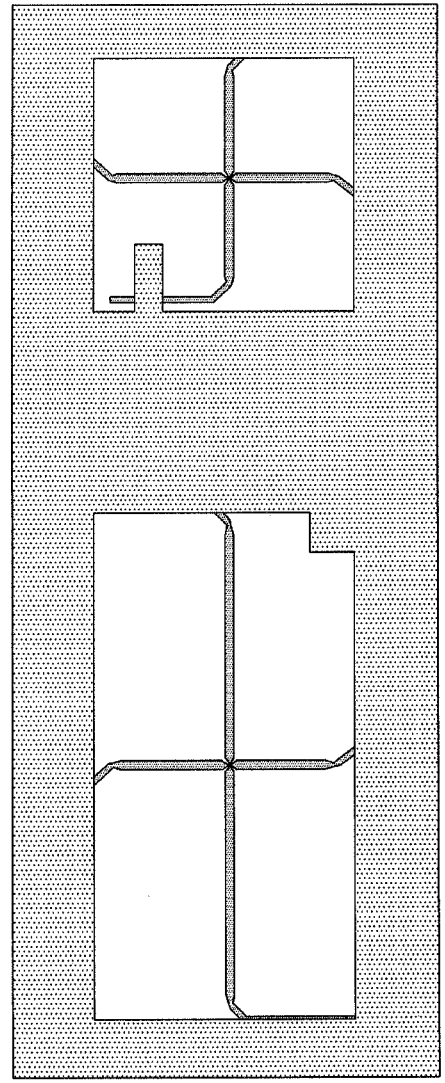
*FIG.19B*  *FIG.19C*

LIQUID CRYSTAL DISPLAY PANEL WITH MULTI-DOMAIN UNIT PIXELS AND AN OPTICAL MASK FOR MANUFACTURING THE SAME

CROSS-REFERENCE TO RELATED APPLICATION

This application claims priority under 35 U.S.C. §119(a) to a Korean Patent Application filed in the Korean Intellectual Property Office on Jul. 30, 2010 and assigned Serial No. 10-2010-0074249 and a Korean Patent Application filed in the Korean Intellectual Property Office on Dec. 30, 2010 and assigned Serial No. 10-2010-0139663, the disclosures of which are incorporated by reference herein in their entireties.

BACKGROUND OF THE INVENTION

1. Technical Field

The present invention relates to a liquid crystal display panel with multi-domain unit pixels and an optical mask for manufacturing the liquid crystal display panel in a photo-alignment process.

2. Discussion of the Related Art

A liquid crystal display module includes a liquid crystal display panel, on which images are displayed by changing an arrangement of liquid crystal molecules in a liquid crystal layer according to an electrical field generated in the liquid crystal layer, a backlight assembly for providing light to the liquid crystal display panel, and a case in which the liquid crystal display panel and the backlight assembly are fixed.

A liquid crystal display panel includes the liquid crystal layer, a pair of substrates with the liquid crystal layer interposed therebetween, and a pair of polarizers attached to the exteriors of the substrates. It is desirable for an image displayed on a liquid crystal display panel to have the same display quality no matter which direction it is viewed. To this end, many attempts have been made. For example, a Vertical Alignment (VA) mode liquid crystal display, which uses verticality of liquid crystal molecules with respect to a substrate, and a Plane to Line Switching (PLS) mode liquid crystal display, which uses horizontality of liquid crystal molecules with respect to a substrate have been developed. Because the liquid crystal molecules of these displays have similar refractive-index anisotropy characteristics in different directions, VA and PLS mode liquid crystal displays have a wide viewing angle.

For more improved viewing angle characteristics, patterns of metal wires, slits or projections made of an organic film are formed on unit pixels so that liquid crystal molecules may have a similar slope in different directions. However, since liquid crystal molecules are affected by a fringe field, the patterns, the slits or the projections may reduce an aperture ratio, which is a ratio of the region where the light provided from a backlight assembly passes through a unit pixel to the total area of the unit pixel. The term 'unit pixel' as used herein may refer to a pixel representing the basic colors of a liquid crystal display panel.

Liquid crystal molecules should always maintain the same arrangement with respect to the same potential. To this end, a pretilt is formed in an alignment film on a substrate to fix a direction and a slope of liquid crystal molecules located near the substrate. The pretilt of an alignment film is formed by physically rubbing a rubbing cloth on an alignment material previously formed on the substrate. However, the method of using the rubbing cloth may reduce the yield of liquid crystal display panels since a foreign substance may be introduced or static electricity may occur on the alignment layer due to the contact. In addition, rubbing cloths are frequently replaced, causing an increase in process time and cost.

To improve yield of a liquid crystal panel, a photo-alignment process has been introduced. The photo-alignment process forms a pretilt of an alignment film using a non-contact method without forming patterns, slits or projections in a pixel region. The photo-alignment process includes applying a photo-reactive material onto a substrate and obliquely irradiating ultraviolet (UV) light to the surface on which the photo-reactive material is applied. A pretilt of an alignment film is formed according to the direction of the irradiation. Accordingly, liquid crystal molecules may be tilted in several different directions by dividing a unit pixel into several regions and irradiating light thereto in different directions.

For example, a unit pixel may be divided in horizontal and vertical directions to have four domains. Liquid crystal molecules are tilted in different directions according to the domains. However, liquid crystal molecules located at boundary parts between neighboring or adjacent domains may not be tilted to correspond to a voltage applied to the pixel. As a result, these liquid crystal molecules may block light, forming a Domain Boundary Texture (DBT) where a normal luminance does not appear in the domain. In other words, the DBT is a dark part or a shadow of a unit pixel, and distinguishes domains whose liquid crystal molecules are tilted in different directions.

A unit pixel has a pixel electrode formed on one substrate, a common electrode formed on another transparent substrate spaced apart from the substrate of the pixel electrode, and a liquid crystal layer interposed between the two substrates. The pixel electrode is formed on each of a plurality of unit pixels arranged on one substrate while the common electrode is formed on the entire surface of another substrate, causing a fringe field to be formed between the edge of the pixel electrode and the common electrode. Liquid crystal molecules, which are influenced by the fringe field, are independently arranged without being affected by a pixel potential, and block the light provided from the backlight assembly, forming a Fringe Field Texture (FFT) where the normal luminance does not appear in the domain.

Directions of pretilts of respective domains are matched to polarization axes of polarizers attached to substrates of a liquid crystal display panel. Since the pretilts of the respective domains are substantially perpendicular to at least one polarization axis, the light which has passed through liquid crystal molecules near the DBTs or the edge of the pixel electrode is not perpendicular to the polarization axes of the polarizers. As a result, the luminance may be locally reduced in the DBTs or in vicinity of the edges of the domains.

An aperture ratio of a unit pixel is calculated by dividing an area of the unit pixel having the normal luminance by the total area of the unit pixel. A light transmittance of a unit pixel is calculated by dividing a luminance at which light has penetrated the unit pixel by a luminance of the backlight assembly before light penetrates the unit pixel. Both the DBT and the FFT lead to a reduction in the luminance of unit pixels, causing a decrease in the aperture ratio and the light transmittance of the multi-domain unit pixels.

In the photo-alignment process, an angle of a pretilt, or a pretilt angle, is determined according to the intensity of the irradiated light and/or the irradiation time. If the pretilt angle is excessively large, the molecules farther from the alignment film may be falsely arranged not to agree with the potential applied to the pixel electrode. As a result, unit pixels may show a luminance higher or lower than the normal luminance, reducing a contrast ratio of the liquid crystal display panel and causing a black afterimage phenomenon in which a gray color appears in the unit pixel when a signal representing a black image is provided to a pixel electrode.

SUMMARY OF THE INVENTION

Exemplary embodiments of the present invention provide a liquid crystal display panel with a unit pixel having reduced area Domain Boundary Textures (DBTs) and Fringe Field Textures (FFTs), and a method for manufacturing the same.

Exemplary embodiments of the present invention provide a liquid crystal display panel with a unit pixel having an improved aperture ratio and light transmittance, and a method for manufacturing the same.

Exemplary embodiments of the present invention provide a liquid crystal display panel capable of preventing a black afterimage phenomenon, and a method for manufacturing the same.

Exemplary embodiments of the present invention improve the display quality of a liquid crystal display panel through combinations of pretilts of alignment films and polarization axes of polarizers.

In accordance with an exemplary embodiment of the present invention, a liquid crystal display panel has a unit pixel. The unit pixel includes a first substrate having a first alignment film, a second substrate having a second alignment film spaced apart from and facing the first alignment film, and a liquid crystal layer interposed between the first alignment film and the second alignment film. In addition, the unit pixel has first and second adjacent domains, each of which includes a domain boundary region defining part of an area between the adjacent domains, and a normal-luminance region adjacent to the domain boundary region. Pretilt angles of liquid crystal molecules near the first alignment film in the domain boundary regions are greater than pretilt angles of liquid crystal molecules near the first alignment film in the normal-luminance regions, or pretilt angles of liquid crystal molecules near the second alignment film in the domain boundary regions are greater than pretilt angles of liquid crystal molecules near the second alignment film in the normal luminance regions.

Each of the domain boundary regions is greater than about 5.0 µm wide.

Pretilt angles of liquid crystal molecules in the domain boundary regions are greater than about 1.8°, and the pretilt angles of liquid crystal molecules in the normal-luminance regions are less than the pretilt angles of the liquid crystal molecules in the domain boundary regions by about 0.2° or more.

Pretilt angles of liquid crystal molecules in at least one of the domain boundary regions increase as the domain boundary region extends from a side of the domain boundary region adjacent to the normal-luminance region toward another side of the domain boundary region.

DBTs are formed in each of the domain boundary regions, and a sum of widths of the domain boundary regions between adjacent domains is greater than a sum of widths of the DBTs between the adjacent domains.

In accordance with an exemplary embodiment of the present invention, a liquid crystal display panel includes a unit pixel. The unit pixel has a first alignment film formed on a first substrate and a second alignment film formed on a second substrate and facing the first alignment film. The unit pixel has a plurality of adjacent domains each having a normal-luminance region and domain boundary regions each domain boundary region defining part of an area between the adjacent domains. A magnitude of a normal-luminance region alignment vector, which is obtained by adding an alignment vector of the first alignment film in a normal-luminance region to an alignment vector of the second alignment film, is less than a magnitude of a domain boundary region alignment vector, which is obtained by adding an alignment vector of the first alignment film in a domain boundary region adjacent to the normal-luminance region to the alignment vector of the second alignment film.

The second alignment film has a first alignment vector and a second alignment vector, which face opposite directions, and the first alignment film has a third alignment vector and a fourth alignment vector, which are perpendicular to the first alignment vector and the second alignment vector, and face opposite directions, respectively. The unit pixel has four different normal-luminance region alignment vectors determined from the first to fourth alignment vectors.

In accordance with an exemplary embodiment of the present invention, one substrate of two substrates of a unit pixel may have alignment vectors whose number is the same as the number of domains of the unit pixel, while the other substrate does not have an alignment vector. The liquid crystal display panel further includes a first polarizer and a second polarizer, the first and second polarizers having a first polarization axis and a second polarization axis, respectively, which cross the normal-luminance region alignment vectors at an angle of about 45°, and the domain boundary regions each have a DBT region having liquid crystal molecules arranged in parallel to the first polarization axis or the second polarization axis, and a luminance-improved region having liquid crystal molecules crossing the first polarization axis or the second polarization axis.

In accordance with an exemplary embodiment of the present invention, a liquid crystal display panel includes a unit pixel. The unit pixel includes a pixel electrode formed on a first substrate, a wiring pattern which is arranged around the pixel electrode on the first substrate and is an electrode including an opaque material, and a common electrode which is formed on the second substrate. In addition, the pixel electrode has a projection in an edge region of the pixel electrode, in which an FFT is located, and the projection overlaps the wiring pattern.

The pixel electrode is substantially rectangular in shape, one side of the pixel electrode has the projection and a recess formed connectively with the projection, and the projection is greater than about 6 µm wide.

The wiring pattern includes a storage electrode partially overlapping an edge of the pixel electrode, and the projection overlaps the storage electrode.

The wiring pattern includes a data line spaced apart from the pixel electrode, and the projection overlaps the data line.

The wiring pattern of the unit pixel includes a storage electrode partially overlapping the projection of the pixel electrode, and a data line spaced apart from an edge of the pixel electrode, and the pixel electrode has on one side thereof the projection and a recess connectively formed with the projection. The data line and the storage electrode of the unit pixel cross each other near a region where the projection and the recess of the pixel electrode meet.

The second substrate further includes a black matrix for blocking light incident upon a side of the second substrate opposite the side on which the common electrode is formed, and the black matrix covers the projection of the pixel electrode, the storage electrode, and the data line on the first substrate.

In accordance with an exemplary embodiment of the present invention, a mask includes a unit masking pattern for forming pretilt angles in a unit pixel of a liquid crystal display panel. The unit masking pattern has a substantially rectangular pattern, on which a non-irradiation part pattern, a domain boundary region pattern, and a normal-luminance region pattern are disposed in sequence. The non-irradiation part pattern has a first light blocking region, which is located on one side of the unit masking pattern and completely blocks light. The normal-luminance region pattern has a first light transmission region and a second light blocking region, and has a normal-luminance region transmittance ratio, which is obtained by dividing an area of the first light transmission region by an area of the normal-luminance region pattern. The domain boundary region pattern has a second light transmission region and a third light blocking region, and has a domain boundary region transmittance ratio, which is obtained by dividing an area of the second light transmission region by an area of the domain boundary region pattern. The transmittance ratio of the domain boundary region pattern is greater than the transmittance ratio of the normal-luminance region pattern.

The domain boundary region pattern has a first irradiation part and a second irradiation part, which are adjacent to each other. The first irradiation part is included in the second light transmission region and light is transmitted through the entirety of the first irradiation part, and the second irradiation part is included in a third light transmission region, which includes the third light blocking region. The first irradiation part is in contact with the non-irradiation part pattern, and the second irradiation part is in contact with the normal-luminance region pattern. The third light blocking region of the second irradiation part has a light blocking length parallel to the normal-luminance region pattern, and the light blocking length is shorter as the third light blocking region is farther away from the normal-luminance region pattern.

The third light blocking region of the second irradiation part is an isosceles triangle having a bottom side abutting the normal-luminance region pattern.

The mask includes a plurality of the unit masking patterns repeatedly arranged in adjacent lines and is configured to be moved in a direction perpendicular to a direction in which the unit masking patterns are repeatedly arranged, such that the third light blocking region of the domain boundary region pattern has a light blocking length in a direction parallel to a direction in which the mask moves, and the light blocking length is longer as the third light blocking region is closer to the normal-luminance region pattern, and shorter as the third light blocking region is closer to the first irradiation part.

The domain boundary region pattern is about 5 μm or more wide. In addition, the domain boundary region pattern may be about 8 μm or less wide.

The transmittance ratio of the normal-luminance region pattern ranges from 25% to 35%.

The domain boundary region pattern is configured to provide first light energy over zero to a texture region of the unit pixel and the normal-luminance region pattern is configured to provide second light energy over zero to a normal-luminance region of the unit pixel, wherein the first and second light energies are different.

In accordance with an exemplary embodiment of the present invention, a liquid crystal display panel includes a unit pixel, the unit pixel including: a first domain, a second domain and a domain boundary region between the first and second domains, wherein the domain boundary region includes a first domain boundary region as part of the first domain and a second domain boundary region as part of the second domain, the first and second domain boundary regions are adjacent to each other, wherein the first domain includes a normal-luminance region and the first domain boundary region includes a texture adjacent to the second domain boundary region and a luminance improved region adjacent to the normal-luminance region, and wherein the normal-luminance region has a luminance greater than a luminance of the texture and the luminance improved region has a luminance between the luminances of the normal-luminance region and the texture.

BRIEF DESCRIPTION OF THE DRAWINGS

The above and other features of the present invention will become more apparent by describing in detail exemplary embodiments thereof with reference to the accompanying drawings, in which:

FIGS. 19B and 19C are, respectively, plan views of a second substrate having a black matrix, and the unit pixel made by assembling the first substrate and the second substrate of FIGS. 19A and 19B.

DETAILED DESCRIPTION OF EXEMPLARY EMBODIMENTS

Exemplary embodiments of the present invention will now be described in detail with reference to the accompanying drawings. The present invention may, however, be embodied in many different forms and should not be construed as being limited to the embodiments set forth herein.

Figure 1:
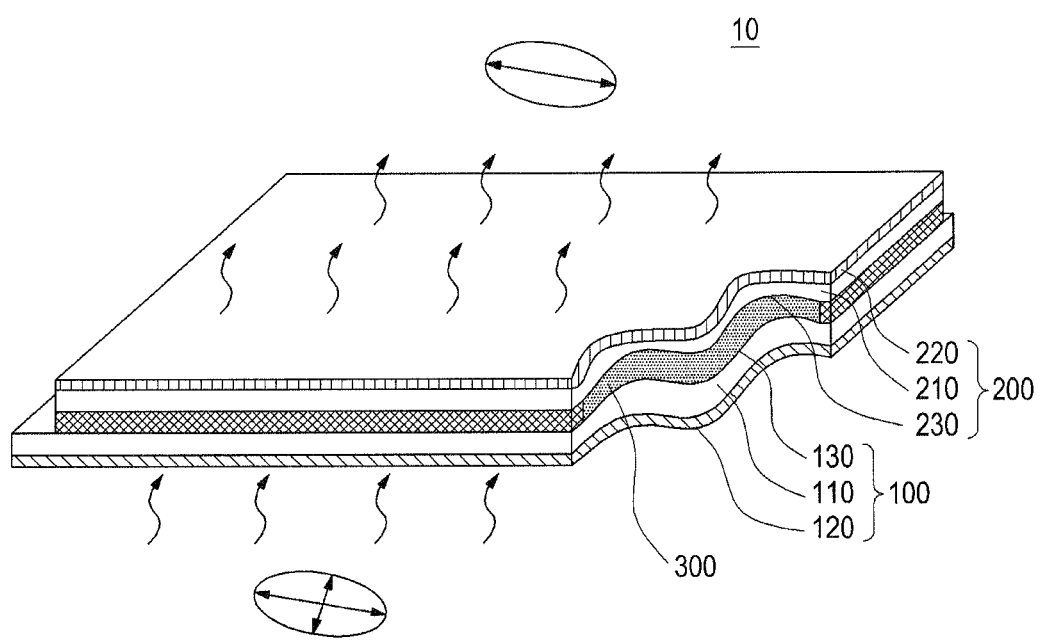
FIG. 1 is a perspective view of a partial cross section of a liquid crystal display panel.

Like reference numerals may refer to the same elements, features and/or structures in the drawings and the following description. To better understand exemplary embodiments of the present invention, a brief description of a prior art liquid crystal display panel will be made with reference to FIGS. 1 to 3. FIG. 1 is a perspective view of a partial cross section of a liquid crystal display panel, which shows a combination of a liquid crystal layer and substrates having polarizers and alignment films. Referring to FIG. 1, a liquid crystal display panel 10 has a first substrate 100, a second substrate 200, and a liquid crystal layer 300 interposed therebetween.

The first substrate 100 has a first polarizer 120, a first base substrate (or underlying substrate) 110, and a first alignment film 130, which are stacked in sequence. The first base substrate 110 is made of a transparent material, and can pass the light irradiated from a backlight assembly (not shown). The first polarizer 120 receives the light from the backlight assembly, which has various polarization components, and passes only some polarization components toward the liquid crystal layer 300. As shown in FIG. 1, the first polarizer 120 is manufactured in the form of a thin film and attached to the outer surface of the first base substrate 110, which faces the backlight assembly. In the alternative, the first polarizer 120 may be applied onto the inner surface of the first base substrate 110, which faces the liquid crystal layer 300.

The first alignment film 130 is made of a polymer material, and its surface is physically bonded with liquid crystal molecules. This physical assembly is used to adjust a pretilt of the liquid crystal molecules. To be specific, the pretilt means that the liquid crystal molecules near the alignment film are tilted in a specific direction with respect to the surface of the alignment film. A pretilt angle may refer to an angle at which the pretilt is made with respect to either the surface or perpendicular to the surface of the alignment film. The pretilt and the pretilt angle are constant regardless of the pixel voltage applied to unit pixels of a liquid crystal display panel, and induce other nearby liquid crystal molecules to be arranged in a specific direction according to the pixel voltage. Although the pretilt and the pretilt angle have been described as characteristics of liquid crystal molecules near an alignment film, it will be understood by those of ordinary skill in the art that since the pretilt and the pretilt angle are determined based on the material and structure of the alignment film, they become characteristics of an alignment film of a unit pixel.

A pretilt is determined according to properties of liquid crystal molecules in a liquid crystal layer. For example, if liquid crystal molecules are for a Vertical Alignment (VA) mode liquid crystal display, the pretilt is made in a specific direction that is perpendicular to a direction in which an alignment film is extended. In the alternative, if liquid crystal molecules are for a Plane to Line Switching (PLS) mode liquid crystal display, the pretilt is made in a specific direction parallel to the surface of an alignment film. In another alternative, if liquid crystal molecules are for a Twisted Nematic (TN) mode liquid crystal display, the pretilt is made at a specific angle with respect to the surface of an alignment film.

The pretilt may be made by a photo-alignment process. The photo-alignment process includes applying an alignment film material to a base substrate, and inducing photopolymerization by obliquely irradiating light such as specifically polarized ultraviolet (UV) rays to give the alignment layer a pretilt and a pretilt angle.

The second substrate 200 has a second polarizer 220, a second base substrate 210, and a second alignment film 230, which are stacked in sequence. The basic properties of key elements of the second substrate 200 are generally similar to those described in relation to the first substrate 100. However, they may be different in the following aspects, but exemplary embodiments of the present invention are not limited thereto.

The first substrate 100 may have several patterns made of a conductive material, such as gate lines, data lines and pixel electrodes. On the other hand, the second substrate 200 may have a common electrode and a plurality of color filters. In particular, each of the color filters represents each of the basic colors, and constitutes a unit pixel by being combined with a pixel electrode on the first substrate 100. The basic colors may be the three primary colors of red, green and blue, or cyan, yellow and magenta. A unit pixel is a basic unit capable of representing various gray scales of a unit color, and for this operation, the color filter may be located together with the pixel electrode on the first base substrate 110 rather than the second base substrate 210.

A common electrode (not shown) may be disposed on the second substrate 200 of the liquid crystal display panel 10, which in this example is VA mode. The common electrode forms a pixel potential together with a pixel electrode (not shown) on the first substrate 100, allowing a unit pixel to represent various gray scales. While differences between the second substrate 200 and the first substrate 100 have been described so far, it will be understood by those of ordinary skill in the art that various other differences may exist due to a change of the liquid crystal's mode to the PLS mode and a change of the liquid crystal display panel 10 to a reflection type rather than the transmission type.

A direction of a polarization axis of the second polarizer 220 on the second substrate 200 is determined based on the polarization axis of the first polarizer 120 and the mode of the liquid crystal molecules. For example, in the case where liquid crystal molecules have the VA mode, since normally black is used to increase a contrast ratio, polarization axes of the first and second polarizers 120 and 220 are perpendicular to each other. The term 'normally black' refers to the situation where when no potential is applied to the liquid crystal display panel 10, the light from the backlight assembly is completely blocked by the liquid crystal display panel 10.

The polarizers 120 and 220 are attached to the base substrates 110 and 210 such that their polarization axes are substantially parallel with the sides of the substrates 100 and 200. The light radiated from the backlight assembly passes through the first polarizer 120 in a linearly polarized way. While passing through liquid crystal molecules, the linearly polarized light is either converted into circularly polarized light or elliptically polarized light, or remains to be linearly polarized light according to the arrangement of the liquid crystal molecules. For example, if liquid crystal molecules are arranged perpendicular to the substrates 100 and 200, the linearly polarized light, which has passed through the first polarizer 120, cannot pass through the second polarizer 220 which has a polarization axis perpendicular to the first polarizer 120.

On the other hand, if liquid crystal molecules are arranged to be tilted to the substrates 100 and 200, polarization components are converted into either circularly polarized components or elliptically polarized components because of the optical anisotropy of the liquid crystal molecules. Therefore, the linearly polarized light, which has passed through the polarization axis of the first polarizer 120, can pass along the polarization axis of the second polarizer 220. However, the amount of the passing light is different according to the arrangement of liquid crystal molecules. In particular, if liquid crystal molecules are arranged to cross the polarization axis of the first polarizer 120 at an angle of 45°, the light is linearly polarized while passing through the polarization axis of the first polarizer 120, circularly polarized while passing through the liquid crystal molecules, and linearly polarized again while passing through the polarization axis of the second polarizer 220, thus ensuring the highest transmittance efficiency of the light from the backlight assembly. However, as the angle between the liquid crystal molecules and the polarization axis gets farther from 45°, the transmittance efficiency of the light gets lower.

The first and second substrates 100 and 200 have first and second pretilt angles, respectively. Based on the pretilt angles, directions and slopes of liquid crystal molecules adjacent to the first and second alignment films 130 and 230 are determined. Since liquid crystal molecules located in the middle of the liquid crystal layer 300 are affected by the slope and direction of liquid crystal molecules adjacent to the alignment films 130 and 230, the arrangement of liquid crystal molecules may be determined by the combination of the first and second pretilt angles.

The pretilt angles can be represented as vectors having a direction and a magnitude. Therefore, controlling the arrangement of liquid crystal molecules with the combination of the first and second pretilt angles is represented as a vector sum of the pretilt angles. Since a light transmittance efficiency of a liquid crystal display panel is highest when liquid crystal molecules cross the polarization axes of the polarizers at an angle of 45°, a vector sum of the pretilt angles is determined such that the liquid crystal molecules cross the polarization axes at an angle of substantially 45°.

A unit pixel representing one basic color has a plurality of domains, each of which has a different vector sum of pretilt angles. Therefore, liquid crystal molecules of a unit pixel may be arranged in different directions, facilitating uniform radiation of light in different directions of the liquid crystal display panel 10.

Figure 2:
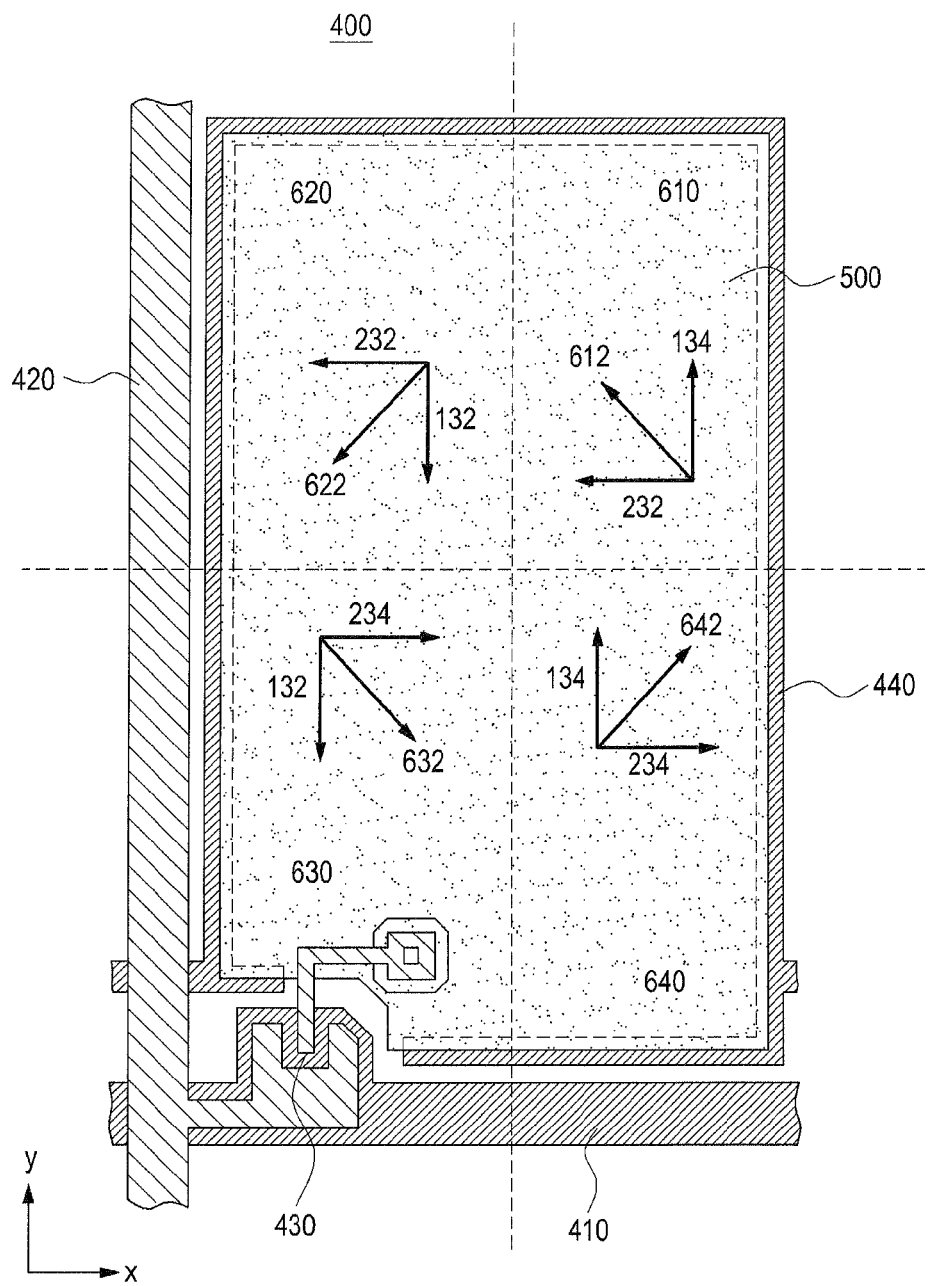
FIG. 2 is a plan view of a first substrate of a unit pixel included in the liquid crystal display panel of FIG. 1.

FIG. 2 is a plan view of a first substrate of a unit pixel, which shows one of the unit pixels included in the liquid crystal display panel 10 of FIG. 1 having a plurality of domains. Referring to FIG. 2, a unit pixel 400 has a gate line 410, a data line 420, a thin film transistor 430 and a storage electrode 440 on a first base substrate, and is set such that a specific pixel voltage is applied to a pixel electrode 500. A voltage on the pixel electrode 500 forms a pixel potential together with a common electrode (not shown) on the second substrate 200, and liquid crystal molecules of the unit pixel 400 vary in arrangement according to the pixel potential.

The unit pixel 400 in FIG. 2 has four domains, which have first to fourth domain alignment vectors 612, 622, 632 and 642, respectively. Each of the domain alignment vectors 612, 622, 632 and 642 is a sum of an alignment vector of the first substrate 100, which has third and fourth alignment vectors 132 and 134 facing negative and positive directions on the y-axis, and an alignment vector of the second substrate 200, which has first and second alignment vectors 232 and 234 facing negative and positive directions on the x-axis. Since the domain alignment vectors 612, 622, 632 and 642 are different from one another in this way, liquid crystal molecules in the unit pixel 400 face in different directions.

The unit pixel 400 has a specific aperture ratio. The aperture ratio is a ratio of an area of the unit pixel 400 where light from a backlight assembly passes to the total area of the unit pixel 400. In FIG. 2, an aperture ratio may be calculated by excluding areas of the wires 410, 420, 430 and 440 made of an opaque material from the total area of the unit pixel 400. However, if a potential is applied to the unit pixel 400, the area where light passes decreases due to the arrangement of liquid crystal molecules, reducing the aperture ratio of the unit pixel 400.

Figure 3:
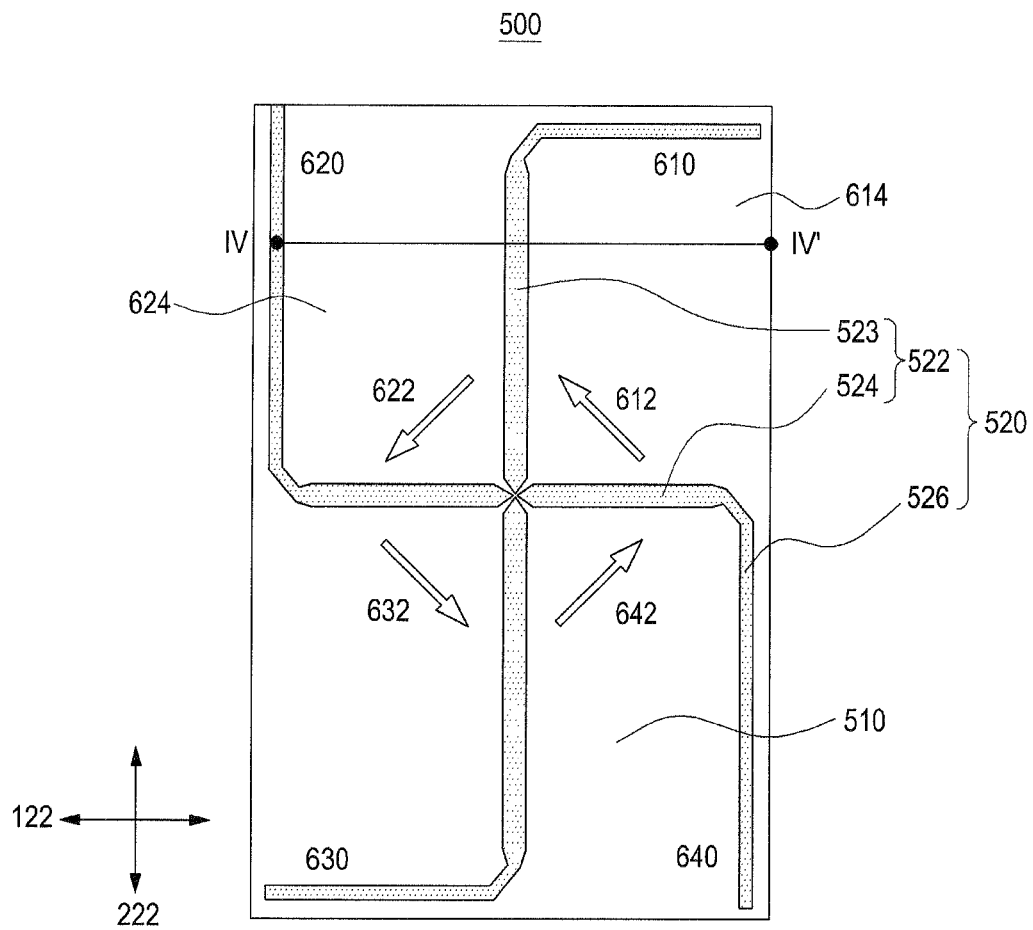
FIG. 3 is a plan view of a pixel electrode in the unit pixel of FIG. 2.

FIG. 3 is a plan view of a pixel electrode, which shows textures where luminance decreases due to the arrangement of liquid crystal molecules, in the unit pixel 400 of FIG. 2. Referring to FIG. 3, a pixel electrode 500 has a normal-luminance region 510 where a desired normal luminance appears, and an abnormal-luminance region 520 where luminance is lower than the desired luminance. Liquid crystal molecules in the normal-luminance region 510 are arranged to cross the polarization axes of the polarizers 120 and 220 formed on the first and second substrates 100 and 200 at an angle of substantially 45°. On the other hand, liquid crystal molecules in the abnormal-luminance region 520 are arranged not to cross the polarization axes of the polarizers 120 and 220 at an angle of 45°. As a result, in the abnormal-luminance region 520, a part of the light does not pass along the polarization axes of the polarizers 120 and 220, reducing the luminance. The abnormal-luminance region 520 is visually identified in a unit pixel, and called a texture.

The abnormal-luminance region 520 is classified into two types: Domain Boundary Texture (DBT) and Fringe Field Texture (FFT), according to the cause.

First, the abnormal-luminance region 520 is a DBT(s) 522 occurring in the boundary region between adjacent domains. The DBT 522 is a phenomenon where the luminance is decreased since liquid crystal molecules are not arranged to cross the polarizing axes at an angle of 45° since the domain alignment vectors are different between neighboring domains. In addition, the DBT 522 is a name of the luminance-decreased area.

For example, in FIG. 3, an alignment vector 612 of a normal-luminance region 614 in a first domain 610 crosses first and second polarization axes 122 and 222 of a liquid crystal display panel, which are shown outside the pixel electrode 500, at an angle of substantially 45°. Likewise, an alignment vector 622 of a normal-luminance region 624 in a neighboring second domain 620 crosses the first and second polarization axes 122 and 222 at an angle of substantially 45°. However, since liquid crystal molecules in the boundary region between the two domains 610 and 620 have an intermediate alignment with respect to the alignment vectors 612 and 622 of the first and second domains 610 and 620, they are nearly parallel with the polarization axes 122 and 222. Therefore, the luminance decreases, causing the occurrence of a texture.

The aforementioned DBT 522 is a domain vertical-boundary texture 523 occurring in a vertical direction of the pixel electrode 500. For similar reasons, the DBT 522 may also occur in a horizontal direction, and this is a domain horizontal-boundary texture 524 shown in FIG. 3. The DBTs 523 and 524 are luminance decreasing phenomena that take place between domains having different alignment vectors. A reduction in the size of their areas can increase an aperture ratio of the unit pixel 400.

Although in the foregoing description, the domains 610, 620, 630 and 640 are distinguished by having different alignment vectors 612, 622, 632 and 642, it may also be understood that the domains 610, 620, 630 and 640 are distinguished by the DBTs 522. In other words, since all neighboring domains have different alignment vectors 612, 622, 632 and 642, and the DBTs 522 also occur between the neighboring domains, the domains can be described as both regions having different alignment vectors and regions distinguished by DBTs. Accordingly, a specific domain shown in FIG. 3 has a domain vertical-boundary texture 523, a domain horizontal-boundary texture 524, and a normal-luminance region 510 between the textures 523 and 524.

Second, the abnormal-luminance region 520 is an FFT(s) 526 occurring at the edge of the pixel electrode 500. A common electrode on the second substrate 200 is formed on the entire surface of the second substrate 200. On the other hand, pixel electrodes 500 on the first substrate 100 are formed on individual unit pixels 400 to be separated from neighboring pixel electrodes. As a result, a fringe field is formed at the edge of the pixel electrode 500 of the unit pixel 400, and the fringe field has liquid crystal molecules uniformly tilted towards the inside of the pixel electrode 500 regardless of the pixel potential. Therefore, luminance at the part where the fringe field is formed is lower than luminance at the inside of the pixel electrode 500, resulting in the occurrence of the FFT 526.

A decrease in area of the DBT 522 and the FFT 526 can improve an aperture ratio and a light transmittance efficiency of a unit pixel. To be specific, the areas of the textures 522 and 526 may be reduced by adjusting pretilt angles of alignment films and/or changing shapes of wires and/or pixel electrodes.

Figure 4:
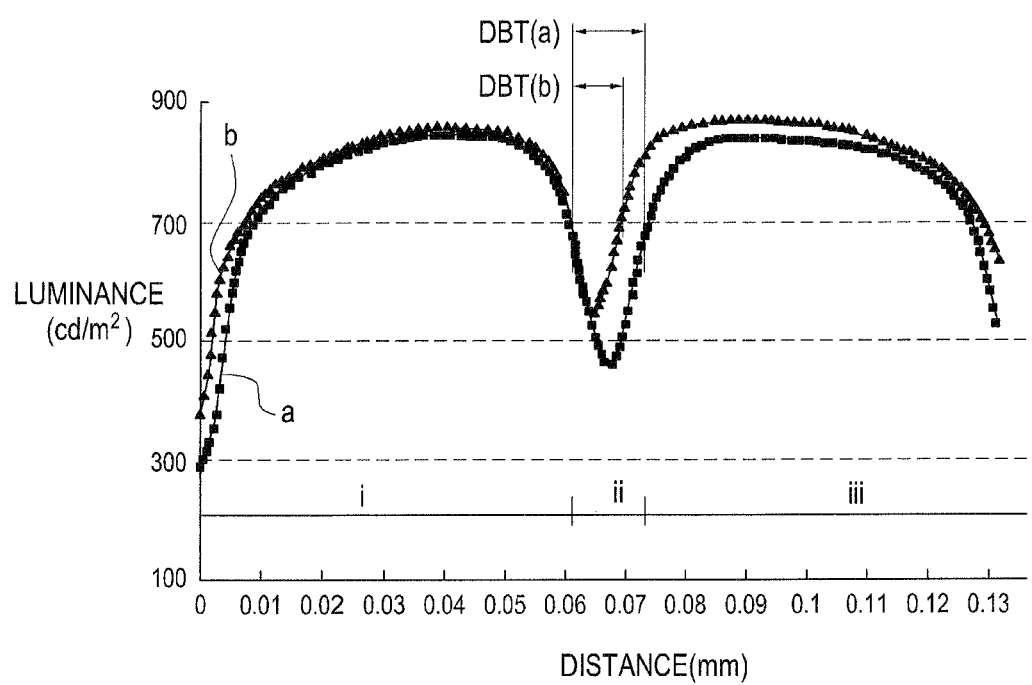
FIG. 4 is a luminance graph obtained by measuring luminances of two unit pixels taken along line IV-IV' of FIG. 3.

Hereinafter, a detailed description of exemplary embodiments of the present invention will be made with reference to FIGS. 4 to 19C. FIG. 4 is a luminance graph obtained by measuring luminances of two unit pixels having different pretilt angles along line IV-IV' of FIG. 3. Referring to FIG. 4, it is noted that a DBT of a unit pixel having a larger pretilt angle is smaller in area.

To be specific, the horizontal axis of FIG. 4 represents a distance in millimeters (mm), which goes away from the origin along the line IV-IV', and its origin is the left FFT IV of the pixel electrode 500 in FIG. 3. The vertical axis represents luminance in $cd/m^2$. Since the DBT 522 can be easier to distinguish from a higher luminance in the normal-luminance region 510, data of the graph in FIG. 4 represents luminances measured by applying a gray scale value causing the unit pixels to emit light a maximum luminance. The luminances were measured using a ProMetric Imaging Photometer and Colorimeter (Model No: PM1433F-1) manufactured by Radiant Imaging, Inc. at intervals of 0.48 μm. It should be noted that the unit pixels in FIG. 4 have a normally black mode and a VA mode, which are used as experimental conditions throughout the detailed description of the present invention.

The graph of FIG. 4 has two curves, 'a' and 'b'. The curve 'a' represents luminance data of a unit pixel in FIG. 3, of which the first and second alignment films 130 and 230 have a pretilt angle of 1°, and the curve 'b' represents luminance data of a unit pixel whose two alignment films 130 and 230 have a pretilt angle of 3°.

The curve 'a' is divided into sections T to according to the change in luminance. The section 'i' is a section from the origin to a point where a DBT starts to appear, is a region where light passes in a unit pixel, and corresponds to a normal-luminance region. The section is a section where light does not pass in the unit pixel, and corresponds to a DBT. Like the section T, the section 'iii' is a region where light normally passes, and corresponds to a normal-luminance region.

The curve 'b' also shows the same pattern as that of the curve 'a', but is different from the curve 'a' in width of the sections. In particular, the section 'ii' DBT(a) of the curve 'a' is wider than the section 'ii' DBT(b) of the curve 'b'. To be specific, a width of the section 'ii' is a width of a wedge-shaped luminance curve at the luminance having a value determined by subtracting a half of a difference between the maximum luminance and the minimum luminance of neighboring domains from the maximum luminance. For example, the maximum luminance of the curve 'a' in FIG. 4 is 852.6 $cd/cm^2$ at 0.091 mm on the horizontal axis, and the minimum luminance thereof is 456.9 $cd/cm^2$ at 0.067 mm on the horizontal axis. Since a half of the value determined by subtracting the minimum luminance from the maximum luminance is 197.8 $cd/cm^2$, the width of the section 'ii' is a distance of the horizontal axis at the luminance of 654.7 $cd/cm^2$ obtained by adding 197.8 $cd/cm^2$ to 456.9 $cd/cm^2$. The width of the section 'ii' of the curve 'a', measured in this way, is represented by DBT(a), and is about 0.011 mm. On the other hand, the width of the section 'ii' of the curve 'b' is represented by DBT(b), and is about 0.009 mm at 712.0 $cd/m^2$, which is narrower than the width of the curve 'a'.

As described above, the curve 'a' is for a unit pixel having a pretilt angle of 1°, while the curve 'b" is for a unit pixel having a pretilt angle of 3°. It can be seen that since the curve 'b' has a relatively narrow DBT, an alignment film of a unit pixel, having a larger pretilt angle, has a smaller DBT area and can improve an aperture ratio. However, the large pretilt angle may deteriorate the display quality of the unit pixels and a liquid crystal display panel.

FIGS. 5A to 5D show exemplary images displayed by a liquid crystal display panel when different pattern images are provided to the liquid crystal display panel to which a photo-alignment process was applied. It can be seen from FIGS. 5A to 5D that in a liquid crystal display panel having a large pretilt angle, black images were not accurately displayed. To find out whether a liquid crystal display panel normally displays all gray scales, the below-described pattern signals, in which specific luminance values are given in specific forms, are provided to the liquid crystal display panel. By changing a gray scale value provided to a liquid crystal display panel after providing a pattern signal for a specific time, it is possible to determine whether the liquid crystal display panel normally operates.

Figure 5A:
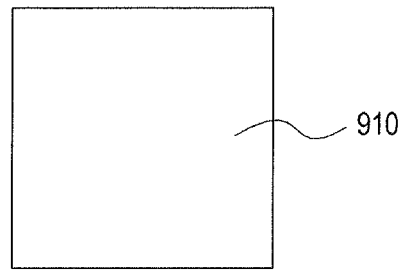
FIGS. 5A to 5D show exemplary images displayed by a liquid crystal display panel when different pattern images are provided to the liquid crystal display panel to which a photo-alignment process was applied.
Figure 5B:
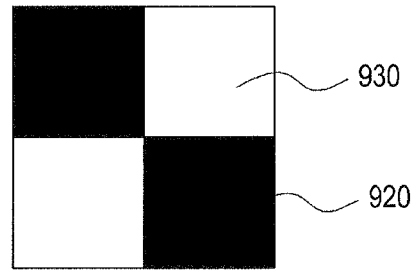
Figure 5C:
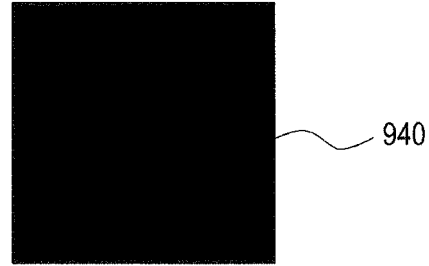

FIG. 5A shows a no-pattern image 910, in which the maximum luminance is given on a liquid crystal display panel after a high-gray scale value was applied to the liquid crystal display panel without a test pattern image being applied. FIG. 5B shows a test pattern image applied to the liquid crystal display panel. The test pattern image is applied in light of the spatial distinction on the liquid crystal display panel to which maximum and minimum gray scales are given simultaneously, and a black image 920 and a white image 930 appear side by side. After being maintained for a predetermined time, e.g., 30 hours, the test pattern is changed to another test pattern. FIG. 5C is a normal black image 940 after a minimum gray scale value is given to the entire liquid crystal display panel, after being changed from the gray scale value of FIG. 5B.

Figure 5D:
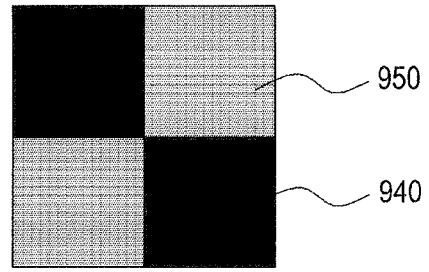

However, in some cases, normal luminance may not appear on the liquid crystal display panel because of the improper arrangement of liquid crystal molecules of the liquid crystal display panel. FIG. 5D is an abnormal image after a minimum gray scale value, which is changed from the gray scale value of FIG. 5B, is given to the entire liquid crystal display panel. In FIG. 5D, a black afterimage phenomenon occurs to black afterimage image 950, which corresponds to the part where a maximum gray scale value was applied previously in FIG. 5B, even though the minimum gray scale value is applied thereto.

The liquid crystal display panel used to represent the images of FIGS. 5A to 5D had liquid crystal molecules of the normally black VA mode. It was determined that the black afterimage image 950 was caused by a phenomenon that happened because the liquid crystal molecules were tilted instead of being vertically arranged on the substrates of the liquid crystal display panel. It was also determined that, because the liquid crystal molecules were tilted, and because the alignment of liquid crystal molecules near alignment films affects an arrangement of liquid crystal molecules in the middle of a liquid crystal layer, the black afterimage phenomenon might happen in a liquid crystal display panel of a large pretilt angle.

As can be understood from the description of FIGS. 4 and 5A to 5D, to reduce the DBTs 522 in the unit pixel 400, alignment films may have a large pretilt angle. However, to reduce the black afterimage phenomenon by adjusting alignment of liquid crystal molecules in the normal-luminance region 510, it may be helpful for alignment films to have a small pretilt angle. In accordance with an exemplary embodiment of the present invention, there is provided a liquid crystal display panel that has a boundary region between the domains of the unit pixel 400 having a pretilt angle larger than that of the normal-luminance region and that reduces a black afterimage phenomenon. To be specific, a pretilt angle of the domain boundary region is greater than about 1.8°, and a pretilt angle of the normal-luminance region is less than the pretilt angle of the domain boundary region by about 0.2° or more.

Figure 6A:
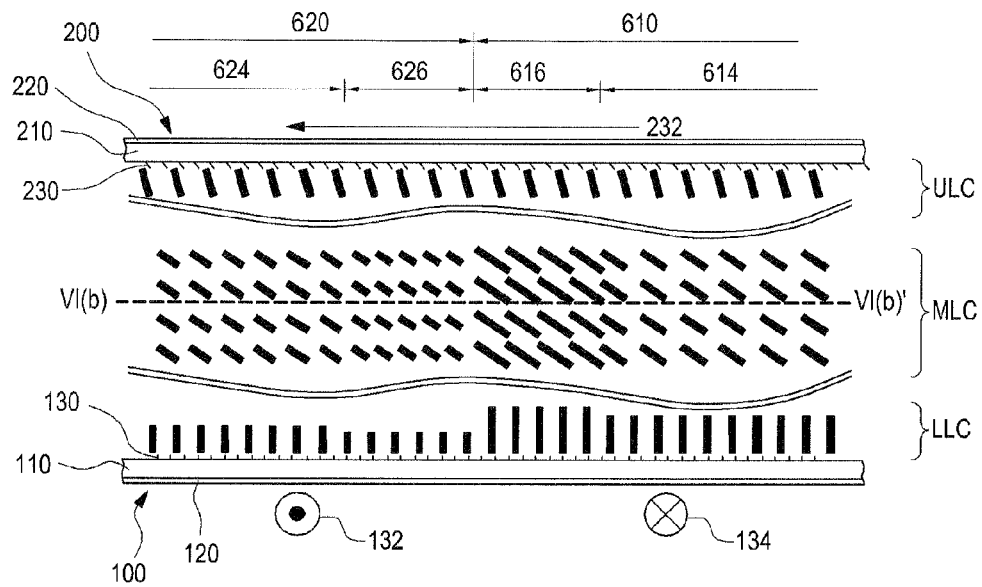
FIGS. 6A and 6B are partial cross sections of a unit pixel, which show pretilt angles and alignment vectors in a domain boundary region and a normal-luminance region, according to an exemplary embodiment of the present invention.

Now, pretilt angles in a domain boundary region and a normal-luminance region will be described with reference to FIGS. 6A and 6B. FIG. 6A is a partial vertical cross section of a first domain, a second domain, and a domain boundary region between the first and second domains, which shows alignments of liquid crystal molecules in the domain boundary region and a normal-luminance region of a unit pixel according to an exemplary embodiment of the present invention. It should be noted that the domains in FIG. 6A are similar to those in the FIG. 3, except for the pretilt angles. For example, in FIG. 3 the pretilt angle of the domain boundary region is the same as the pretilt angle of the normal-luminance region, but in FIG. 6A according to an exemplary embodiment of the present invention, the pretilt angle of the domain boundary region is different from the pretilt angle of the normal-luminance region.

A pixel potential of a mid-gray scale value was applied to the unit pixel of FIG. 6A. Thus, while liquid crystal molecules ULC and LLC near substrates 100 and 200 are aligned substantially perpendicular to the substrates 100 and 200, liquid crystal molecules MLC located in the middle of a liquid crystal layer are arranged to be more tilted with respect to a line perpendicular to the substrates 100 and 200 than the liquid crystal molecules ULC and LLC near the substrates 100 and 200.

Referring to FIG. 6A, a second alignment film 230 has a third alignment vector 232 in both a first domain 610 and a second domain 620. On the other hand, a first alignment film 130 has a first alignment vector 132 and a second alignment vector 134. The third alignment vector 232 heads from the right to the left, and causes the liquid crystal molecules ULC near the second alignment film 230 to be tilted to the right.

The first alignment vector 132 has a direction of coming from the paper and causes the liquid crystal molecules LLC near the first alignment film 130 to be tilted in a direction of entering into the paper. On the other hand, the second alignment vector 134 has a direction opposite to that of the first alignment vector 132, and causes the liquid crystal molecules LLC near the first alignment film 130 to be tilted in a direction of coming out from the paper. In FIG. 6A, to distinguish between the first and second alignment vectors 132 and 134, a length of the liquid crystal molecules having the first alignment vector 132 is shown shorter than a length of the liquid crystal molecules having the second alignment vector 134.

A domain alignment vector 612 of the first domain 610 is a sum of the third and second alignment vectors 232 and 134, and liquid crystal molecules in the first domain 610 are tilted to the left and come out from the paper. A domain alignment vector 622 of the second domain 620 is a sum of the third and first alignment vectors 232 and 132, and liquid crystal molecules in the second domain 620 are tilted to the left and enter into the paper.

The two alignment films 130 and 230 of a unit pixel according to an exemplary embodiment of the present invention have different pretilt angles in normal-luminance regions 614 and 624 and domain boundary regions 616 and 626. Herein, for the pretilt angle, a direction perpendicular to the substrates 100 and 200 is defined as 0°, and an angle by which liquid crystal molecules are tilted with respect to the vertical direction is represented as the pretilt angle.

Referring to FIG. 6A, the pretilt angle of the first domain boundary region 616 of the first alignment film 130 is greater than the pretilt angle of the first normal-luminance region 614. The pretilt angles of the second alignment film 230 are the same in each of the domain boundary region 616 and the normal-luminance region 614. Therefore, an alignment vector of the domain boundary region 616 is greater than an alignment vector of the normal-luminance region 614. Like in the first domain 610, a pretilt angle of a second domain boundary region 626 in the second domain 620 is greater than a pretilt angle of a second normal-luminance region 624, and a pretilt angle of the second alignment film 230 is constant in the two regions 624 and 626. Therefore, an alignment vector of the domain boundary region 626 is greater than an alignment vector of the normal-luminance region 624.

If the alignment vectors of the domain boundary regions 616 and 626 are greater than the alignment vectors of the normal-luminance regions 614 and 624 as described above, more liquid crystal molecules may cross polarization axes of polarizers in the domain boundary regions 616 and 626. As a result, since an increasing amount of the light, which passed through a liquid crystal layer, may pass through a second polarizer 220, the width and area of DBTs may be reduced, and the aperture ratio of a unit pixel may increase. Although the pretilt angles and alignment vectors in the vertical boundary region between the first domain 610 and the second domain 620 have been described so far, it will be understood by those of ordinary skill in the art that in the horizontal boundary regions between the first and fourth domains 610 and 640, the aperture ratio and light transmittance efficiency of a unit pixel may be increased by having the pretilt angles and alignment vectors greater than those of adjacent normal-luminance regions.

Figure 6B:
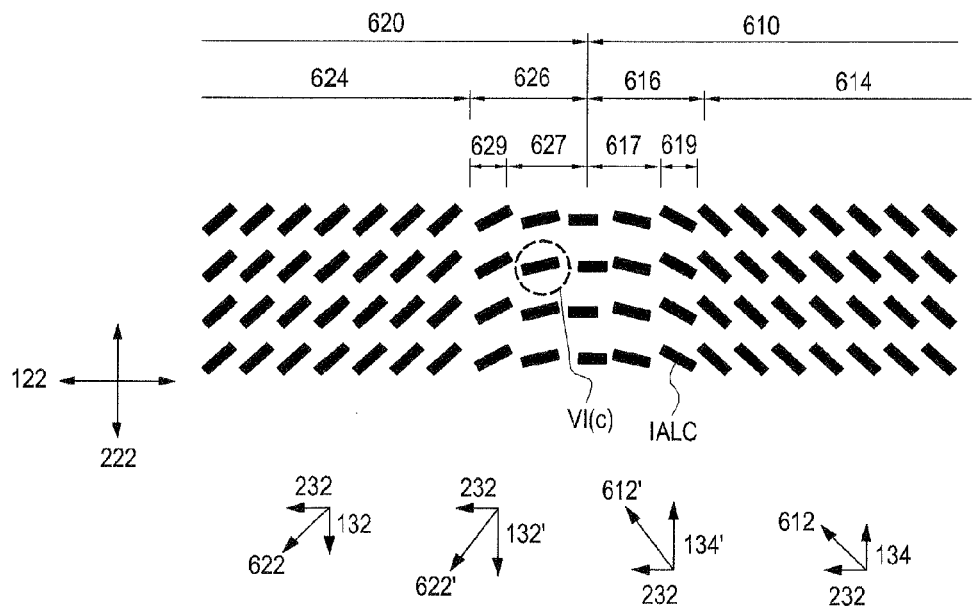

FIG. 6B is a plan view showing an arrangement of liquid crystal molecules located in the middle of the liquid crystal layer of FIG. 6A, taken along line VI(b)-VI(b)' of FIG. 6A in parallel with the first and second substrates 100 and 200. In other words, FIG. 6B is a plan view showing an arrangement of liquid crystal molecules located in the domain boundary regions 616 and 626 and the normal-luminance regions 614 and 624. In FIG. 6B, rods represent individual liquid crystal molecules, and the more parallel to the first and second substrates 100 and 200 the liquid crystal molecules are arranged, the longer their associated rods are represented. Referring to FIG. 6B, since the pretilt angles of the domain boundary regions 616 and 626 are greater than the pretilt angles of the normal-luminance regions 614 and 624, the arrangement of the liquid crystal molecules in the domain boundary regions 616 and 626 becomes more similar to the arrangement of the liquid crystal molecules in the normal-luminance regions 614 and 624, reducing the area and width of DBTs.

Because the pretilt angles of the first and second alignment films 130 and 230 in the normal-luminance regions 614 and 624 are orthogonal to each other but the same in size, the alignment vectors 612 and 622 cross polarization axes 122 and 222 at an angle of substantially 45°, and cause the light, an amount of which corresponds to a pixel potential provided to the unit pixel, to pass through the unit pixel. However, in the boundary regions where the first and second domains 610 and 620 come in contact with each other, the third, first and second alignment vectors 232, 132 and 134 coexist and the liquid crystal molecules are arranged substantially parallel to the first polarization axis 122 rather than crossing the first polarization axis 122, blocking the light from the backlight assembly and causing DBTs. However, if liquid crystal molecules in the boundary regions 616 and 626 are arranged similar to the alignment vectors of the normal-luminance regions 614 and 624, the area of DBTs may be reduced.

Therefore, as described in relation to FIG. 6A, the pretilt angles of the domain boundary regions 616 and 626 are set to be greater than the pretilt angles of the normal-luminance regions 614 and 624. Then, as shown in FIG. 6B, liquid crystal molecules IALC positioned at the edges of the domain boundary regions 616 and 626 are arranged similar to liquid crystal molecules in the normal-luminance regions 614 and 624, improving luminance of the domain boundary regions 616 and 626.

In other words, the domain boundary regions 616 and 626 have textures 617 and 627 and luminance-improved regions 619 and 629. In other words, the domain boundary region 616 in the first domain 610 is greater than the normal-luminance region 614 in terms of the pretilt angle. Therefore, liquid crystal molecules at the edge of the domain boundary region 616 are arranged similar to the alignment vector of the normal-luminance region 614, forming the luminance-improved region 619 where the luminance is improved since the light from the backlight assembly can pass through the second polarizer 220. However, liquid crystal molecules in the other part of the domain boundary region 616 are arranged substantially parallel to the polarization axes 122 and 222, forming the texture regions 617 and 627 where the light from the backlight assembly cannot pass through the second polarizer 220.

Therefore, widths of the domain boundary regions 616 and 626 having a large pretilt angle are broader than the measured widths of the DBTs 617 and 627. Referring to FIG. 6B, a sum of the widths of the domain boundary regions 616 and 626 in the first and second domains 610 and 620 is greater than a width of the DBT measured between the first and second domains 610 and 620. Herein, the measured width of the DBT between the domains is a sum of widths of the DBTs 617 and 627 in the respective domains 610 and 620, and as described in connection with FIG. 4, the measured width is a width corresponding to the medium luminance between the maximum luminance and the minimum luminance, which is measured in a unit pixel when a gray scale voltage for the maximum luminance is applied to the unit pixel.

A structure of a unit pixel similar to that of FIG. 3 will now be described referring to the alignment of liquid crystal molecules in the domain boundary regions 616 and 626 and normal-luminance regions 614 and 624 of FIGS. 6A and 6B, and the principle of light transmission. A unit pixel is divided into domains by DBTs, and each domain has a plurality of alignment vectors. For example, the first domain 610 has an alignment vector 612 of the normal-luminance region 614 and an alignment vector 612' of the domain vertical-boundary region 523. The alignment vector 612 of the normal-luminance region 614, which corresponds to the major region of a specific domain, is the major alignment vector of the first domain 610. The alignment vector 612' of the domain vertical-boundary region 523, which corresponds to the minor region of a specific domain, is an additional alignment vector of the first domain 610. The first domain 610 may further have an alignment vector of the domain horizontal-boundary region 524 as another additional alignment vector.

The additional alignment vectors of the vertical and horizontal boundary regions 523 and 524 are different from the major alignment vector 612 of the normal-luminance region 614. To be specific, the pretilt angles of the first substrate 100 or the second substrate 200 by virtue of the additional alignment vectors of the boundary regions 523 and 524 are greater than the pretilt angles of the substrates 100 and 200 in the normal-luminance region 614, contributing to a decrease in the width of DBTs and an increase in the light transmittance efficiency and aperture ratio of the unit pixel.

The large pretilt angle can reduce the area of DBTs, but the increase in the pretilt angle of the normal-luminance region may cause degradation in the display quality such as a black afterimage phenomenon in the low gray scale. In addition, the increase in the pretilt angle of the normal-luminance region may increase the width of fringe field regions. Therefore, the pretilt angles of the normal-luminance regions and the pretilt angles of the domain boundary regions may be properly adjusted.

Figure 7A:
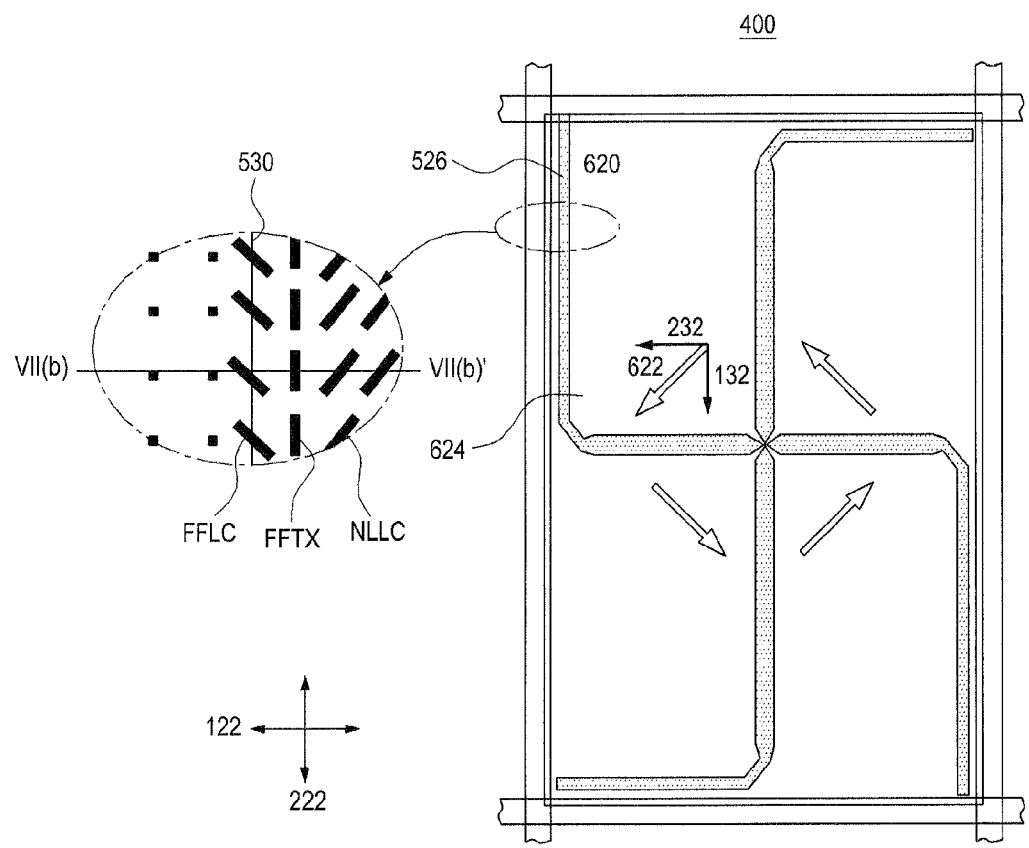
FIGS. 7A and 7B are, respectively, a plan view of a unit pixel with multiple domains, which shows a Fringe Field Texture (FFT) occurring at the edge of a pixel electrode, according to an exemplary embodiment of the present invention, and a cross sectional view of the unit pixel showing a fringe field in the unit pixel and an arrangement of liquid crystal molecules in the FFT taken along line VII(b)-VII(b)' of FIG. 7A.
Figure 7B:
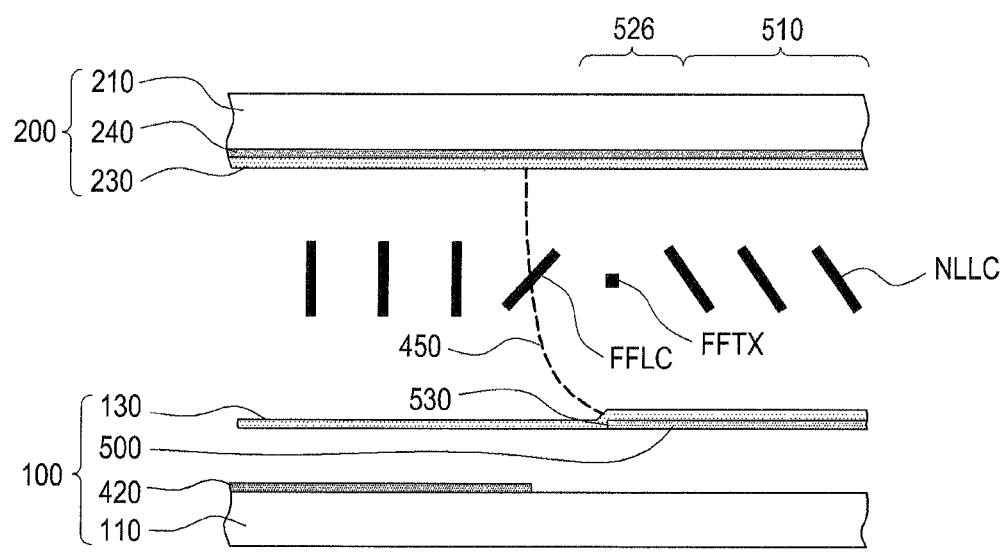

FIG. 7A is a plan view of a unit pixel with multiple domains, on which an FFT occurs at the edge of a pixel electrode, according to an exemplary embodiment of the present invention. FIG. 7B is a cross sectional view of the unit pixel showing a fringe field in the unit pixel and an arrangement of liquid crystal molecules in the FFT, taken along line VII(b)-VII(b)' of FIG. 7A.

Referring to FIG. 7A, in a second domain 620 of a unit pixel 400, there exist fringe field liquid crystal molecules FFLC, which are arranged, by the fringe field, in a direction opposite to liquid crystal molecules NLLC in a normal-luminance region 624. In the second domain 620, there further exist FFT liquid crystal molecules FFTX, which are placed between the liquid crystal molecules NLLC of the normal-luminance region 624 and the liquid crystal molecules FFLC and are parallel or perpendicular to polarization axes 122 and 222. The FFT liquid crystal molecules FFTX block light and reduce the luminance in the unit pixel.

FIG. 7B is a cross section of the unit pixel 400, for describing an occurrence of the FFT 526 in FIG. 7A. Referring to FIG. 7B, a second substrate 200 has a second alignment film 230 and a common electrode 240, which is arranged all over the second substrate 200 and provided with a constant voltage from the outside of a liquid crystal display panel. A first substrate 100 has a first alignment film 130 and a pixel electrode 500, which is formed on every unit pixel and has an edge region 530 thereon. The edge region 530 is the last part of the pixel electrode 500 affected by a voltage on the pixel electrode 500, and forms a fringe field 450 together with the common electrode 240. Liquid crystal molecules FFLC coming under influence of the fringe field 450 are tilted to substantially perpendicularly cross the fringe field 450. In other words, the fringe field liquid crystal molecules FFLC are titled in a direction opposite to the direction in which the liquid crystal molecules NLLC in a normal-luminance region 510 of the pixel electrode 500 are tilted.

Therefore, the liquid crystal molecules FFTX at the part where the liquid crystal molecules FFLC caught by the fringe field 450 and the liquid crystal molecules NLLC in the normal-luminance region 510 meet, are arranged perpendicular to the substrates 100 and 200 as shown in FIG. 7B, and form an FFT 526 where the luminance decreases. Since the fringe field liquid crystal molecules FFLC are tilted diagonally with respect to the substrates 100 and 200, the light from the backlight assembly may pass through them, causing a bright portion to appear outside the FFT 526 in FIG. 7A.

To reduce the area of the FFT 526, a pretilt angle of the edge region 530 of the pixel electrode 500 may be increased. In other words, if the pretilt angle in the vicinity of the edge region 530 is small, the area of the FFT 526 may increase. For example, if the pretilt angle of the alignment film 130 or 230 in the edge region 530 is large, liquid crystal molecules located in the FFT 526 are tilted more and the amount of light passing through the edge region 530 of the pixel electrode 500 may increase, causing a possible reduction in the area of the FFT 526. On the other hand, if the pretilt angle of the alignment film 130 of 230 in the edge region 530 of the pixel electrode 500 is small, liquid crystal molecules located in the FFT 526 are perpendicular to the substrates 100 and 200, and the amount of light passing through the edge region 530 of the pixel electrode 500 decreases, causing an increase in the area of the FFT 526.

As is apparent from the foregoing description, providing the domain boundary regions and the fringe field regions with larger pretilt angles, and the normal-luminance regions with smaller pretilt angles can improve the characteristics of a unit pixel. In accordance with exemplary embodiments of the present invention, a process capable of applying different pretilt angles to different regions in a unit pixel, and an optical mask for the process, will now be described.

Figure 8:
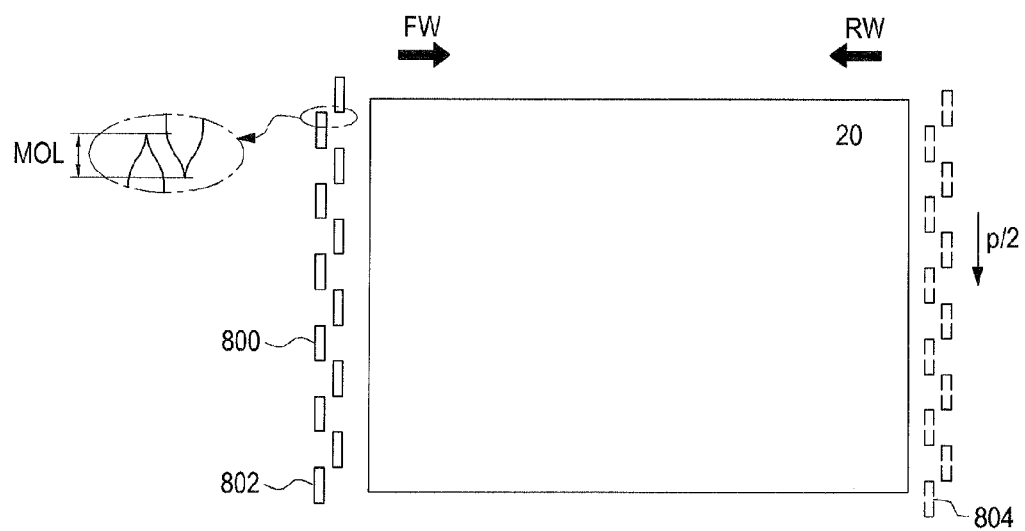
FIG. 8 is a diagram showing a substrate and optical masks for a process of forming pretilt angles in unit pixels of a liquid crystal display panel by irradiating polarized ultraviolet (UV) light to the substrate coated with a photo-alignment material, according to an exemplary embodiment of the present invention.

FIG. 8 is a diagram showing a substrate and optical masks for a process of forming pretilt angles in unit pixels of a liquid crystal display panel by irradiating polarized UV light to the substrate coated with a photo-alignment material, according to an exemplary embodiment of the present invention. Referring to FIG. 8, a plurality of optical masks 800 are arranged outside one side of a photo-alignment substrate 20 where pretilt angles are to be formed. On the photo-alignment substrate 20, a photo-alignment material layer (not shown) is prepared by a process such as spraying, inkjetting and printing, on which a pretilt is to be made by reacting to polarized UV light. The photo-alignment substrate 20 may be one of the above-described first and second substrates 100 and 200.

The optical masks 800 have a plurality of unit masking patterns (not shown) with a plurality of same shapes for forming pretilts in a plurality of unit pixels. The optical masks 800 are arranged outside the photo-alignment substrate 20, forming a plurality of lines, and cause polarized UV light to be irradiated to the photo-alignment substrate 20, while moving over the photo-alignment substrate 20. For example, the optical masks 800 in FIG. 8 are arranged in two alternating lines.

The optical masks 800 each have a micro overlapping region MOL with a pattern formed at their edges so that polarized UV light may pass through the edges. When a specific optical mask moves over the photo-alignment substrate 20, its micro overlapping region MOL overlaps a micro overlapping region of another adjacent optical mask arranged in another line along the direction in which the optical mask moves. Hence, polarized UV light may be irradiated to the entire surface of the photo-alignment substrate 20.

However, if the micro overlapping region MOL is wide, a stitch phenomenon may be observed on the liquid crystal display panel. The stitch phenomenon refers to a phenomenon in which stains are locally viewed on the liquid crystal display panel, and the stitch is caused by excessive light energy focused on a specific region in the photo-alignment process. Therefore, a width of the micro overlapping region MOL is set much narrower than a pitch of a unit pixel, i.e., a length or width of one side of the unit pixel. For example, the width of the micro overlapping region MOL is set narrower than 10 μm. Since a width of a common unit pixel is 150 μm to 450 μm, the overlapping of 10 μm affects the stitch of the unit pixel slightly. In the alternative, the micro overlapping region MOL may correspond to the position of wires of a unit pixel. In addition, the 'cosine' shape of the micro overlapping region MOL in the enlarged part of FIG. 8 can reduce the width of the actual overlapping region, contributing to a further reduction in the stitch effect.

The process of forming pretilts in the photo-alignment substrate 20 can be divided into three steps. A first step is to move optical masks 802 arranged outside one side of the photo-alignment substrate 20 to the outside of the opposite side of the photo-alignment substrate 20 along a forward direction FW. In this step, polarized UV light is obliquely irradiated to the first half area of each unit pixel at a specific angle with respect to the optical masks 802.

A second step is to move the optical masks 804, which have completely passed over the photo-alignment substrate 20, in a downward direction by a half of a pitch p of the unit pixel, and then move them along a reverse direction RW. In this process, polarized UV light is irradiated to the photo-alignment substrate 20 in a direction opposite to that in the first step, and the second half area of each unit pixel is also prepared for pretilt forming. A third step is to apply heat to a photo-alignment material layer to which polarized UV light is irradiated. In this process, a solvent, which was mixed with a photo-alignment material to stably coat the substrate 20 with the photo-alignment material, is vaporized and the photo-alignment material has pretilts.

In the alternative, a process of forming pretilts in the photo-alignment substrate 20 may include a process of fixing positions of the optical masks 800 and moving the photo-alignment substrate 20 with respect to the optical masks 800 on a relative basis. In yet another alternative, a process of forming pretilts in the photo-alignment substrate 20 may include a process of arranging two sets of optical masks 800 at two facing outsides of the photo-alignment substrate 20, and moving each set of the optical masks 800 in the forward direction FW and the reverse direction RW.

The current embodiment of the present invention is provided to form different pretilt angles for a domain boundary region and a normal-luminance region in one domain. Through the aforementioned pretilt forming process, a pretilt of a domain boundary region and a pretilt of a normal-luminance region are formed on a half area of each unit pixel in one direction, and a different pretilt of the domain boundary region and a different pretilt of the normal-luminance region are formed on the other half area in the opposite direction. The pretilt forming process according to exemplary embodiments of the present invention forms the pretilts of the domain boundary regions and the normal-luminance regions not sequentially but simultaneously, contributing to simplification of the process and reduction of the process's time.

Since a liquid crystal display panel is manufactured by assembling two substrates, a liquid crystal display panel having four domains may be manufactured by assembling two photo-alignment substrates in which pretilts are formed by the above process, such that their polarized UV light's irradiation directions are orthogonal to each other. In the alternative, pretilts may be formed only in one substrate of the liquid crystal display panel. To be specific, polarized UV light is irradiated at the opposite sides of one photo-alignment substrate in one direction, allowing the photo-alignment substrate to have two pretilts of the domain boundary regions and two pretilts of the normal-luminance regions. If the same process is performed on the photo-alignment substrate in a direction different by 90°, one photo-alignment substrate has four domains. Thereafter, by assembling another substrate of no pretilt with the photo-alignment substrate while a liquid crystal layer is interposed between the substrates, a liquid crystal display panel, whose individual unit pixel has four different alignment vectors, is manufactured.

Figure 9A:
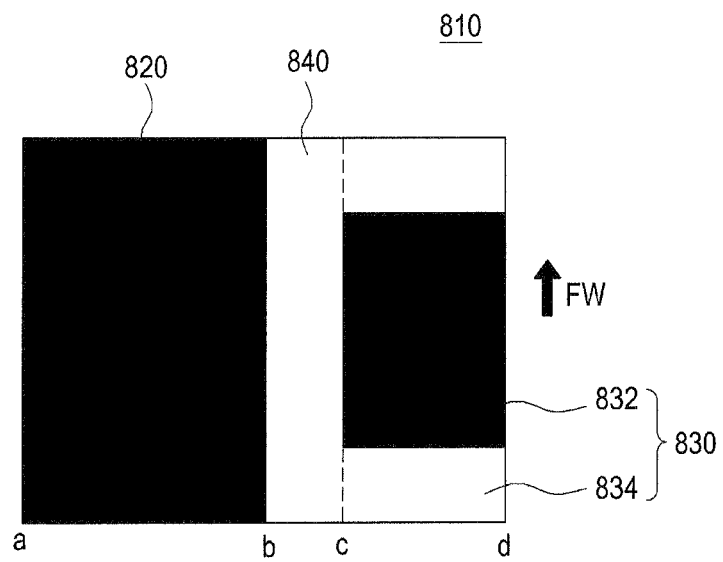
FIGS. 9A and 9B are, respectively, a plan view of a unit masking pattern, which is arranged on an optical mask, and on which a pattern is formed such that a domain boundary region of a unit pixel may have a pretilt angle different from that of a normal-luminance region, according to an exemplary embodiment of the present invention, and a graph showing energies of light irradiated to a photo-alignment substrate with respect to regions of the unit masking pattern of FIG. 9A.

Each of the optical masks 800 for the aforementioned process has a plurality of repeatedly formed unit masking patterns. FIG. 9A is a plan view of a unit masking pattern which is disposed on an optical mask and is patterned to give a unit pixel different pretilt angles in a domain boundary region and a normal-luminance region, according to an exemplary embodiment of the present invention. Referring to FIG. 9A, a unit masking pattern 810 has a non-irradiation part pattern 820, a normal-luminance region pattern 830, and a domain boundary region pattern 840. The optical mask 800 having the unit masking pattern 810 is manufactured with a transparent quartz or glass substrate. Each unit masking pattern 810 may have light blocking films formed on the transparent substrate of the optical mask 800. The light blocking films may be made of a material capable of efficiently blocking light, such as chromium metal, and may be manufactured in various shapes to adjust the amount of light energy passing through the unit masking patterns 810.

To be specific, the non-irradiation part pattern 820, which is a pattern corresponding to a region of a unit pixel, causes no polarized UV light to be irradiated to that region, and has a first light blocking region and blocks all the light irradiated thereto. Therefore, no pretilt is formed on the half area of a unit pixel covered by the non-irradiation part pattern 820. The normal-luminance region pattern 830, which is a pattern corresponding to the normal-luminance region 510 in a unit pixel, is divided into a second light blocking region 832 and a first light transmission region 834 to block a part of the light irradiated thereto. A ratio of an area of the light blocking region 832 to the total area of the normal-luminance region pattern 830 is a light blocking ratio of the normal-luminance region 510. Since the unit masking pattern 810 moves in one direction during the photo-alignment process, even though the light blocking region 832 exists only in a specific part of the normal-luminance region pattern 830, continuous and uniform-energy light is irradiated to the unit pixel.

The domain boundary region pattern 840 is positioned between the non-irradiation part pattern 820 and the normal-luminance region pattern 830. Since the domain boundary region should receive greater light energy than the normal-luminance region 510 to obtain a large pretilt angle, a light blocking ratio of the domain boundary region pattern 840 is lower than that of the normal-luminance region pattern 830. For example, since the domain boundary region pattern 840 of FIG. 9A has no light blocking region, its light blocking ratio is 0%, whereas a light blocking ratio of the normal-luminance region pattern 830 is greater than 0%. It should be noted that according to an exemplary embodiment of the present invention, the light blocking ratio of the normal-luminance region pattern 830 is between the light blocking ratios of the non-irradiation part pattern 820 and the domain boundary region pattern 840.

Figure 9B:
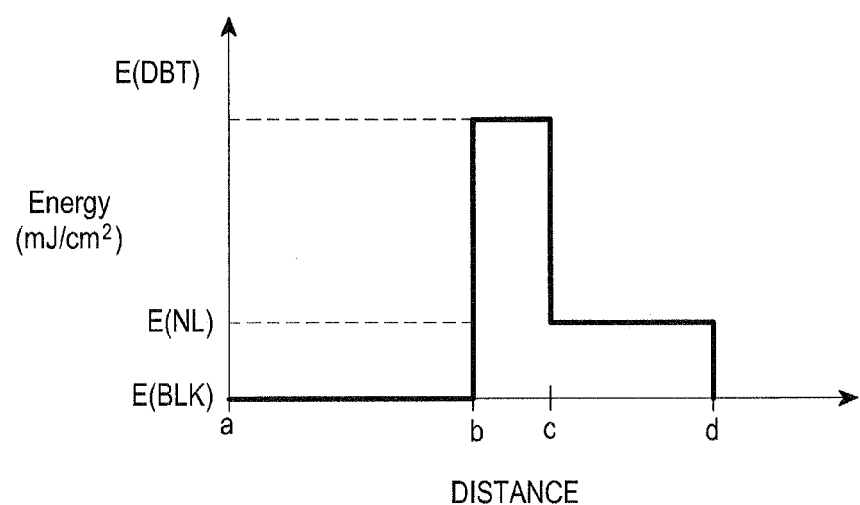

Since the regions 820, 830 and 840 of the unit masking pattern 810 have different light blocking ratios, energy of the light irradiated to the unit pixel is also different according to where the regions 820, 830 and 840 overlap the unit pixel. FIG. 9B is a graph showing energies of the light irradiated to a photo-alignment substrate after passing through the unit masking pattern 810 of FIG. 9A with respect to the regions 820, 830 and 840 of the unit masking pattern 810. Referring to FIG. 9B, since light cannot pass through the non-irradiation part pattern 820, energy E(BLK) of the light irradiated to the photo-alignment substrate is 0 mJ/cm$^2$. In addition, energy E(DBT) of the light passing through the domain boundary region pattern 840 is greatest, and energy E(NL) of the light passing through the normal-luminance region pattern 830 has a value between the other two values. These different light energies cause different pretilt angles to be made in different regions of the unit pixel.

While the domain boundary region pattern 840 in FIG. 9A has no light blocking region, the normal-luminance region pattern 830 has a wide light blocking region 832. Therefore, energies of the light, that the normal-luminance region and the domain boundary region of the unit pixel receive, undergo an abrupt change in their adjacent regions, and liquid crystal molecules located in the adjacent regions cannot be controlled easily, causing degradation in the display quality of the unit pixel. Therefore, the domain boundary region pattern 840 may have an additional pattern, formed adjacent to the normal-luminance region pattern 830, with a light blocking ratio between the light blocking ratios of the normal-luminance region pattern 830 and the domain boundary region pattern 840.

Figure 10A:
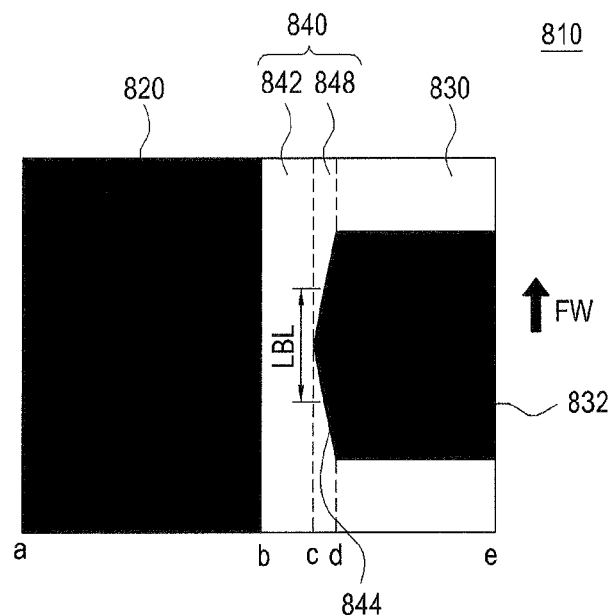
FIGS. 10A and 10B are, respectively, a plan view of a unit masking pattern with a domain boundary region pattern divided into a plurality of irradiation patterns, according to an exemplary embodiment of the present invention, and a graph showing light energies with respect to regions of the unit masking pattern of FIG. 10A.

FIG. 10A is a plan view of a unit masking pattern with a domain boundary region pattern divided into a plurality of irradiation patterns, according to an exemplary embodiment of the present invention. It is to be noted that the unit masking pattern 810 of FIG. 10A is different from the unit masking pattern 810 of FIG. 9A in that the domain boundary region pattern 840 has a plurality of irradiation patterns. To be specific, the domain boundary region pattern (or DBT region) 840 includes a first irradiation pattern 842 with no light blocking region, and a second irradiation pattern 848 having a third light blocking region 844. Therefore, when the unit masking pattern 810 moves in a specific direction while undergoing irradiation of polarized UV light, the light passing through the second irradiation pattern 848 is less in energy than the light passing through the first irradiation pattern 842.

The second irradiation pattern 848 in FIG. 10A has the third light blocking region 844 in a triangular shape. The third light blocking region 844 is an isosceles triangle in shape, with its bottom side in contact with the normal-luminance region while its light blocking length LBL gradually changes. Herein, the light blocking length LBL is a length of a light blocking region in parallel to the unit masking pattern 810 or a forward direction FW in which the light is irradiated when the unit masking pattern 810 moves. To be specific, the closer the light blocking length LBL is to the normal-luminance region pattern 830, the longer the light blocking length LBL becomes; the closer the light blocking length LBL is to the first irradiation pattern 842, the shorter the light blocking length LBL becomes. Therefore, energy of the light passing through the second irradiation pattern 848 gradually decreases in inverse proportion to the light blocking length LBL.

Figure 10B:
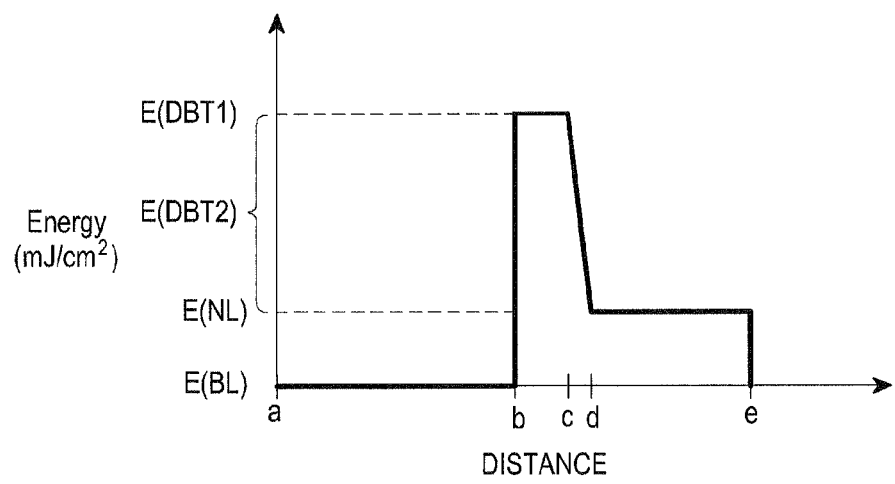

FIG. 10B is a graph showing energies of polarized UV light passing through the unit masking pattern 810 of FIG. 10A with respect to the regions 820, 830 and 840 of the unit masking pattern 810. Referring to FIG. 10B, energy of the light passing through the domain boundary region pattern 840 is divided into two types. To be specific, the first-type energy E(DBT1) of the light passing through the first irradiation pattern 842 is the greatest and constant among the energies of the light passing through the unit masking pattern 810. On the other hand, the second-type energy E(DBT2) of the light passing through the second irradiation pattern 848 gradually decreases from the energy E(DBT1) of the light passing through the first irradiation pattern 842 to the energy E(NL) of the light passing through the normal-luminance region pattern 830. Since light cannot pass through the non-irradiation part pattern 820, its energy is 0 mJ/cm$^2$, and the energy E(NL) of the light passing through the normal-luminance region pattern 830 is lower than the energy E(DBT2) of the light passing through the second irradiation pattern 848.

The second irradiation pattern 848 of the domain boundary region pattern 840 may be made in a part of the domain boundary region in various shapes capable of forming specific pretilt angles. For example, in FIG. 10A, the third light blocking region 844 of the second irradiation pattern 848 is an isosceles triangle in shape, and can gradually change the amount of polarized UV light irradiated to the substrate with respect to the configuration thereof. The third light blocking region 844 may be formed in various other shapes.

FIGS. 11A to 11E are plan views of unit masking patterns, according to exemplary embodiments of the present invention, which show a non-irradiation part pattern, a normal-luminance region pattern, and a domain boundary region pattern, each having different shapes. According to exemplary embodiments of the present invention, energy of the light irradiated to the photo-alignment substrate after passing through the unit masking patterns is least to greatest in order of the light passing through the non-irradiation part pattern, the light passing through the normal-luminance region pattern, and the light passing through the domain boundary region pattern.

Figure 11A:
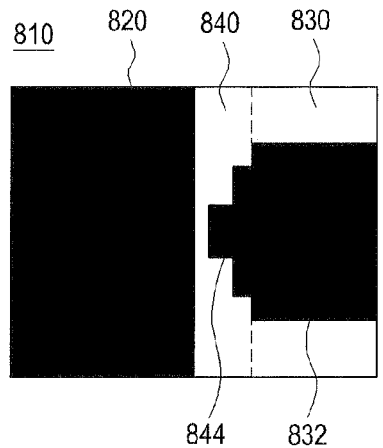
FIGS. 11A to 11E are plan views of unit masking patterns, which show a non-irradiation part pattern, a normal-luminance region pattern, and a domain boundary region pattern, each having various shapes, according to exemplary embodiments of the present invention.

FIG. 11A is a plan view of a unit masking pattern 810, in which a domain boundary region pattern 840 is divided into three different regions according to the size of the third light blocking region 844. Thus, the pretilt angle of the domain boundary region changes according to the configuration of the light blocking region 844, enabling fine control of the arrangement of liquid crystal molecules. Although the DBT region is divided into three sub regions in FIG. 11A, it will be understood by those of ordinary skill in the art that the number of sub regions is not limited thereto.

Figure 11B:
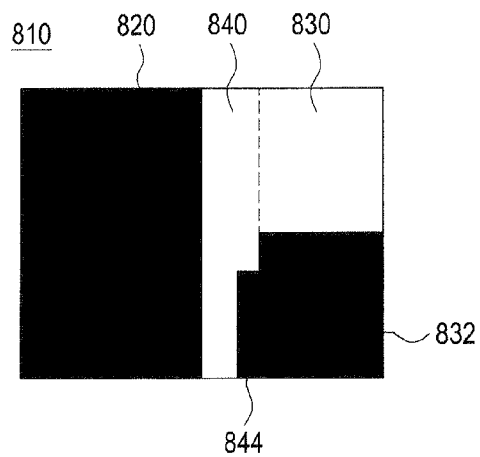

FIG. 11B is a plan view of a unit masking pattern 810, in which unlike those shown in FIGS. 9A, 10A and 11A, the light blocking region 832 of the normal-luminance region pattern 830 is arranged not at the center of the normal-luminance region pattern 830 but at one side thereof. Like the light blocking region 832 of the normal-luminance region pattern 830, the third light blocking region 844 of the domain boundary region pattern 840 also shifts toward one side of the domain boundary region pattern 840. Since the unit masking pattern 810 undergoes irradiation of polarized UV light while moving in a specific direction during the photo-alignment process, its light blocking regions 832 and 844 are allowed to shift towards one side. While the light blocking pattern 844 of the domain boundary region pattern 840 in FIG. 11B is rectangular in shape, in the alternative, the light blocking pattern 844 may be made in a triangular shape whose light blocking length LBL gradually changes as in FIG. 10A so that pretilt angles of the domain boundary region may gradually change.

Figure 11C:
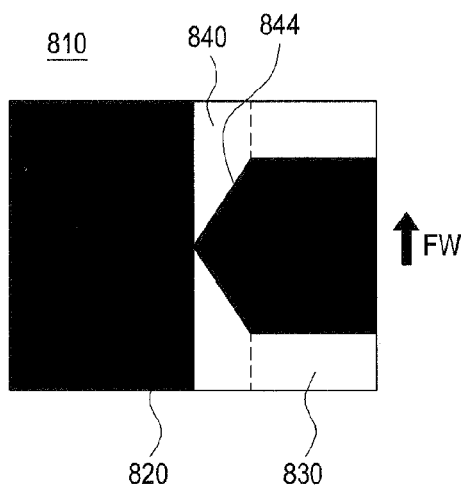

FIG. 11C is a plan view of a unit masking pattern 810, in which the third light blocking region 844 of the domain boundary region pattern 840 is extended compared with that of FIG. 10A. In FIG. 11C, since the third light blocking region 844 of the domain boundary region pattern 840 is formed like in FIG. 10A, its light blocking length LBL gradually decreases as it goes from the normal-luminance region pattern 830 to the non-irradiation part pattern 820. Therefore, for the domain boundary region, as it goes from a region adjacent to the normal-luminance region in contact with its one side to a region close to an adjacent domain in contact with its other side, its pretilt angles increase.

Figure 11D:
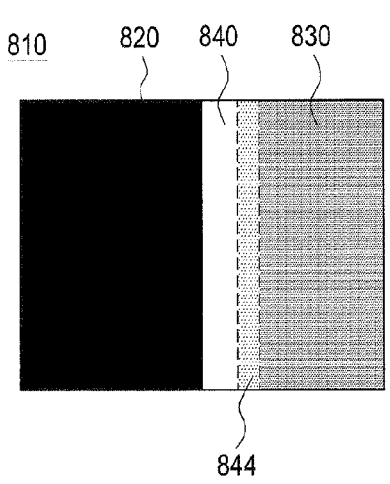

FIG. 11D is a plan view of a unit masking pattern 810 with light blocking regions having different light transmittances. In terms of the light transmittance, the light blocking region of the non-irradiation part pattern 820 is lowest, and the third light blocking region 844 of the domain boundary region pattern 840 is highest. The light transmittance of the normal-luminance region pattern 830 has a value between the light transmittances of the other two regions.

Figure 11E:
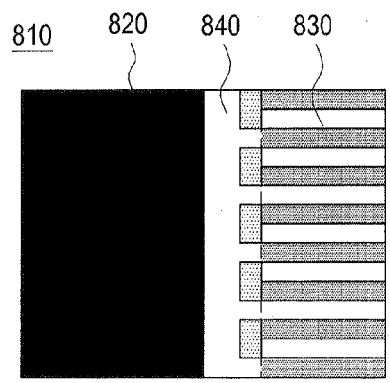

FIG. 11E is a plan view of a unit masking pattern 810, in which light blocking regions and light transmission regions of both of the normal-luminance region pattern 830 and the domain boundary region pattern 840 are repeated. In the repeated patterns, the light transmission regions serve as slits diffracting light, and since they are formed in spacings of several μm, it is possible to adjust pretilt angles of the unit pixel.

The unit masking patterns may be made in a variety of different shapes as shown in FIGS. 9A, 10A and 11A to 11E. The energies of the light passing through constituent regions of the unit masking patterns are adjusted to improve the display quality of a liquid crystal display by reducing black afterimages and improve an aperture ratio of each unit pixel by reducing areas of the abnormal-luminance regions where textures are formed.

Figure 12:
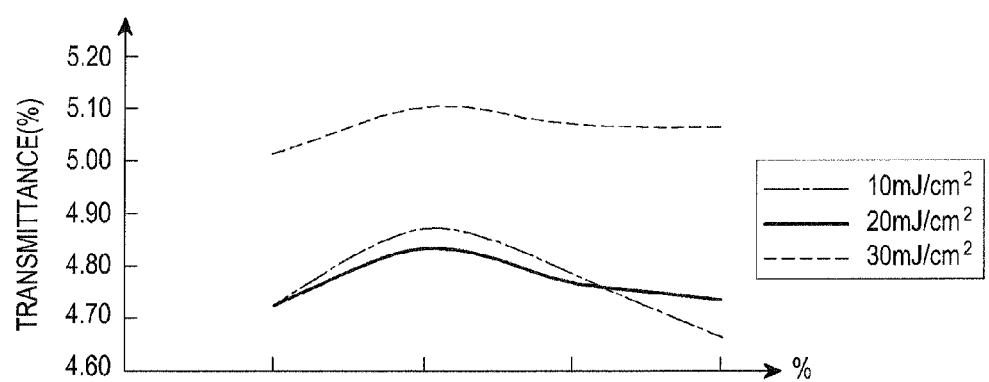
FIG. 12 is a graph showing a relationship between light transmittance of a unit pixel and a ratio of energy of light irradiated to a normal-luminance region to energy of light irradiated to a domain boundary region of a unit pixel.

FIG. 12 is a graph showing a relationship between light transmittance of a unit pixel and a ratio of energy of light irradiated to a normal-luminance region to energy of light irradiated to a domain boundary region of a unit pixel. Referring to FIG. 12, the values of both energies of light irradiated to the domain boundary region and normal-luminance region and the pretilt angles thereof in obtaining excellent light transmittance was found.

The horizontal axis of FIG. 12 represents ratios of energies of light irradiated to the normal-luminance regions and energies of light irradiated to the domain boundary regions of a unit pixel. The vertical axis thereof represents light transmittance obtained by measuring an actual luminance of a liquid crystal display panel having a plurality of unit pixels. The data was obtained by measuring light transmittances for energies 10 mJ/cm², 20 mJ/cm² and 30 mJ/cm² of the light irradiated to the domain boundary regions.

For the measurements, the unit masking pattern 810 of FIG. 9A, to which the domain boundary region pattern 840 with no light blocking region was applied, was used, and illuminance of the polarized UV light irradiated to the unit masking pattern 810 was 40 mW/cm². For energies of the light irradiated to the domain boundary region to be 10 mJ/cm², 20 mJ/cm² and 30 mJ/cm², the substrate for photo-alignment was transferred at a speed of 180 mm/sec, 120 mm/sec and 60 mm/sec, respectively. Pretilt angles of the alignment film used for the measurement of FIG. 12 were roughly proportional to the energies of the irradiated light. In other words, pretilt angles for energies 9 mJ/cm², 10 mJ/cm², 20 mJ/cm² and 30 mJ/cm² of the irradiated light were 1.60°, 1.61°, 1.78° and 1.80°, respectively.

Referring to FIG. 12, for each curve, its maximum light transmittance appeared when the energy of the light irradiated to the normal-luminance region was about 30% of the energy of the light irradiated to the domain boundary region. If the ratio is less than 30%, a pretilt angle of the normal-luminance region decreases, causing the liquid crystal molecules adjacent to an alignment layer to be disposed more perpendicular to the alignment layer of the normal luminance region and a decrease in the light transmittance. On the contrary, if the ratio is greater than 30%, a difference between the pretilt angle of the domain boundary region and the pretilt angle of the normal-luminance region decreases, causing an increase in the area of the domain boundary region and a decrease in the light transmittance.

Therefore, in a unit pixel, according to an exemplary embodiment of the present invention, the energy of the light irradiated to the normal-luminance region is about 30% of the energy of the light irradiated to the domain boundary region. The term 'about 30%' means a range between 25% and 35%. Since the graph of FIG. 12 was obtained using the domain boundary region pattern 840 with no light blocking region as shown in FIG. 9A, the area of the light blocking region 832 in the normal-luminance region pattern 830 is about 30% of the area of the normal-luminance region pattern 830.

It can be seen from FIG. 12 that light transmittance was excellent at energy 30 mJ/cm² of the light irradiated to the domain boundary region. It addition, since the light transmittance was best when the energy of the light irradiated to the normal-luminance region was 30% of the energy of the light irradiated to the domain boundary region, to improve light transmittance of the unit pixel, the pretilt angle of the domain boundary region can be greater than 1.80°, which was a pretilt angle at the energy 30 mJ/cm² of the irradiated light.

In addition, the energy of the light irradiated to the normal-luminance region is 9 mJ/cm² or 30% of the energy of the light irradiated to the domain boundary region, and its associated pretilt angle is 1.60°. Therefore, it could be seen that since a difference between pretilt angles of the domain boundary region and the normal-luminance region was 0.20°, a difference between pretilt angels of a domain boundary region and a normal-luminance region of a unit pixel may be 0.20° or more.

Increasing the pretilt angle to improve light transmittance may cause black afterimages in a unit pixel. Therefore, pretilt angles that can improve both the light transmittance and the black afterimage are to be determined. Now, reference will be made to FIGS. 13A and 13B to describe pretilt angles of normal-luminance regions where black afterimages were improved.

Figures 13A, 13B:
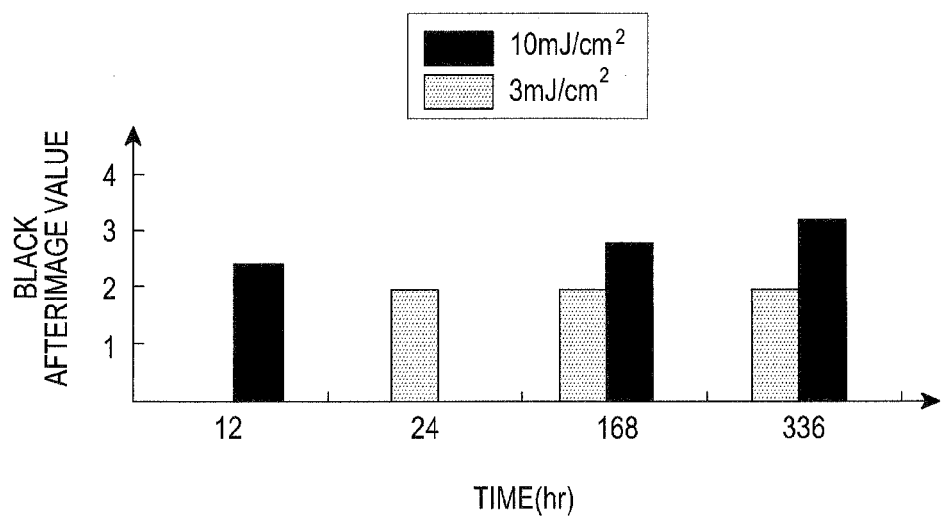
FIGS. 13A and 13B are, respectively, a table showing measurement criteria for black afterimage indices of a liquid crystal display panel manufactured by a photo-alignment process, and a graph showing a relationship between observed black afterimage values and energies of the light irradiated to a normal-luminance region of a unit pixel.

FIG. 13A is a table showing black afterimage indices associated with observation positions of one observer. The black afterimage index is divided into 5 levels according to how much the luminance or chrominance observed at the front or side of a liquid crystal display panel is different from a normal value. The observation at the front is made one meter away from the image, and the observation at the side is made one meter away from the image and at an angle of 60° with respect to the front of the image. In the observation, the quality of an image observed at the front and side is classified into 'Good', 'Slightly Poor' and 'Little Poor'. Then a black afterimage index for one liquid crystal display panel based on the observations made by one observer can be determined from the table of FIG. 13A.

A black afterimage value of a liquid crystal display panel is determined as an average of black afterimage indices measured by several observers. If the black afterimage value is 2, a good image is observed in front thereof and a slightly poor image can be recognized at the side thereof by an expert like the observer. Therefore, a liquid crystal display panel with a black afterimage value of 1 or 2 is commonly classified as a normal liquid crystal display panel.

FIG. 13B is a graph showing a relationship between observed black afterimage values and energies of the light irradiated to a normal-luminance region of a unit pixel over time after the manufacture of a liquid crystal display panel. Pretilt angles and energies of the light irradiated to the normal-luminance region of a unit pixel that can give the unit pixel an excellent display quality without black afterimages, can be determined from FIG. 13B. To obtain the black afterimage values of FIG. 13B, the alignment film of FIG. 12 was applied to the test liquid crystal display panel, and light with energies of 3 mJ/cm² and 10 mJ/cm² was irradiated to the alignment film. The manufactured liquid crystal display panel was stored at 25° C.

Referring to FIG. 13B, for the normal-luminance region that underwent irradiation of light with the energy of 10 mJ/cm², its black afterimage value exceeded 2, twelve hours after the liquid crystal display panel was manufactured, and the black afterimage value continued to increase over time. It can be seen that since the observed black afterimage value exceeded 2, which is the black afterimage value of the liquid crystal display panel having the excellent display quality, it is not good to irradiate the light with the energy of 10 mJ/cm$^2$ to the normal-luminance region.

Since the black afterimage value of the normal-luminance region, which underwent irradiation of the 3 mJ/cm$^2$-energy light, was 2, twelve hours after the manufacturing, and remained at 2 past twelve hours, 3 mJ/cm$^2$ is an appropriate energy of the light that can be irradiated to the normal-luminance region. Therefore, it could be seen that irradiating light with the energy of 3 mJ/cm$^2$ or less to the normal-luminance region of the unit pixel and the pretilt angle corresponding to 3 mJ/cm$^2$ contributed to the manufacture of a liquid crystal display panel having an excellent display quality.

Figure 14:
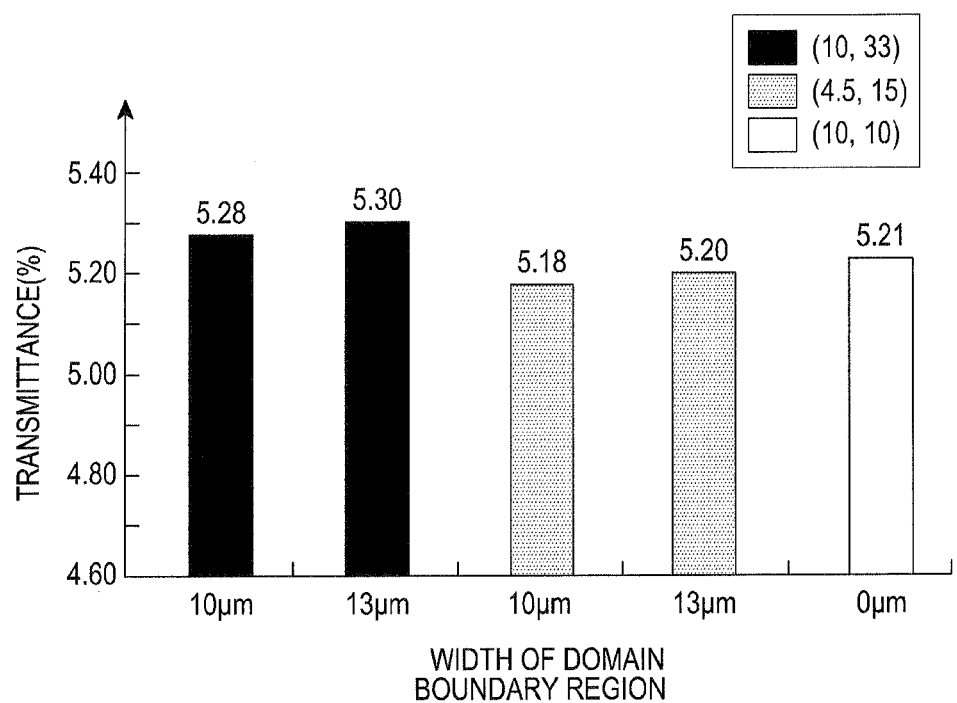
FIG. 14 is a graph showing a relationship between a width of a domain boundary region of a unit pixel and light transmittance of the unit pixel when light with different energies is irradiated to the domain boundary region and normal-luminance region of the unit pixel.

For the black afterimage value and light transmittance of the liquid crystal display panel to be improved, a width of the domain boundary region of the unit pixel may be properly determined. FIG. 14 is a graph showing a relationship between a width of a domain boundary region of a unit pixel and light transmittance of the unit pixel when lights with different energies are irradiated to the domain boundary region and normal-luminance region of the unit pixel. How to determine the width of the domain boundary region of a unit pixel with an improved light transmittance can be understood from FIG. 14.

In FIG. 14, the unit mJ/cm$^2$ of light energy is omitted from a combination (a, b) of energy 'a' of the light irradiated to a normal-luminance region of a unit pixel and energy 'b' of the light irradiated to a domain boundary region of a unit pixel. In other words, there are three types of (a, b): (10, 33), (4.5, 15) and (10, 10). Herein, a unit pixel to which (10, 10) was applied was used as a reference unit pixel (or object to be compared) having no domain boundary region.

Each of the combinations is divided into two different unit pixels, and widths of domain boundary regions are 10 μm and 13 μm, respectively. The experiment was performed under conditions that light was irradiated to the domain boundary regions through the unit masking pattern 810 having the first irradiation pattern 842 comprised of only the light transmission region and the second irradiation pattern 848 having a partial light blocking region, as shown in FIG. 10A, and the two irradiation regions of the unit masking pattern 810 were the same in width.

Referring to FIG. 14, the lower the energy of the light irradiated to the normal-luminance region was, the lower the light transmittance was. In other words, for a unit pixel in which 4.5 mJ/cm$^2$-energy light was irradiated to the normal-luminance region and a width of the domain boundary region was 10 μm, its light transmittance was 5.18%, which is lower than light transmittance 5.21% of the reference unit pixel. However, the light transmittance of the unit pixel increased with the increase in the width of the domain boundary region. For example, if the domain boundary region of the unit pixel, to which 4.5 mJ/cm$^2$-energy was applied, increased from 10 μm to 13 μm in width, the light transmittance of the unit pixel increased to 5.20%, becoming similar to the light transmittance 5.21% of the reference unit pixel. Likewise, for (10, 33), the increase in the width of the domain boundary region contributed to improving the light transmittance of the unit pixel. Therefore, it can be seen that the width of the domain boundary region may be appropriate when greater than 10 μm.

Figure 15A:
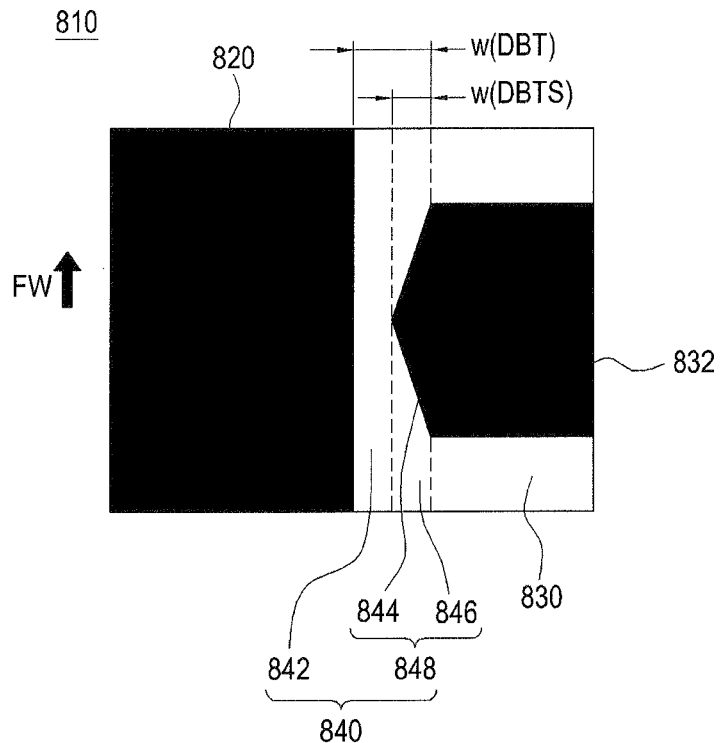
FIGS. 15A and 15B are, respectively, a plan view of a unit masking pattern to which a domain boundary region pattern and second irradiation pattern having different widths are applicable, according to an exemplary embodiment of the present invention, and a graph showing a relationship between an area or width of the domain boundary region pattern and second irradiation pattern of FIG. 15A and associated light transmittances of a unit pixel.
Figure 15B:
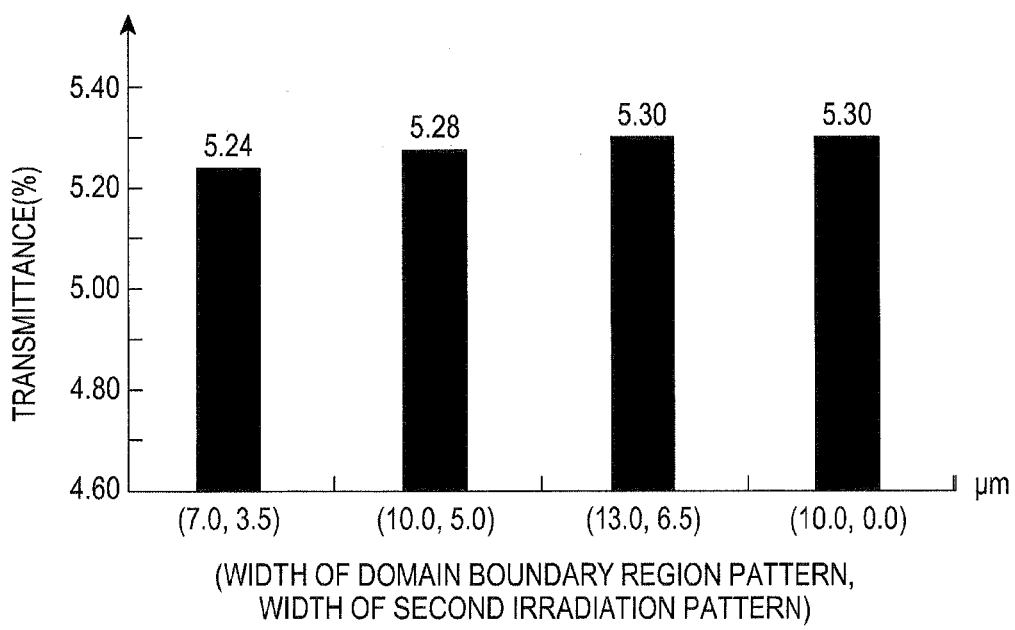

An appropriate width of the domain boundary region may be found using a relationship between widths of various domain boundary region patterns and associated light transmittances of the unit pixel. FIG. 15A is a plan view of a unit masking pattern 810, according to an exemplary embodiment of the present invention, to which a domain boundary region pattern 840 and a second irradiation pattern 848 with various widths are applicable. FIG. 15B is a graph showing a relationship between an area or width of the domain boundary region pattern 840 and the second irradiation pattern 848 of the unit masking pattern 810 in FIG. 15A and associated light transmittances of a unit pixel.

Referring to FIG. 15A, while the second irradiation pattern 848 of the domain boundary region pattern 840 has a third light blocking region 844 and a second light transmission region 846, the first irradiation pattern 842 has only a light transmission region without any light blocking region. The first and second irradiation patterns 842 and 848 are the same in width and area, so width w(DBT) of the domain boundary region pattern 840 is double a width w(DBTS) of the second irradiation pattern 848. By adjusting the width w(DBT) of the domain boundary region pattern 840, light transmittance of the unit pixel may change as represented in FIG. 15B.

The horizontal axis of FIG. 15B represents various parenthesized combinations of widths w(DBT) of the domain boundary region pattern 840 and widths w(DBTS) of the second irradiation pattern 848. The widths of the domain boundary region pattern 840 range from 7.0 μm to 13.0 μm, and a reference unit masking pattern (or object to be compared) is a unit masking pattern in which the domain boundary region pattern 840 without the second irradiation pattern 848 is formed 10 μm thick.

The vertical axis of FIG. 15B represents measured light transmittances of the unit pixel when 33 mJ/cm$^2$-energy light is irradiated to the unit masking pattern 810 having the combinations of widths of the domain boundary region pattern 840 and widths of the second irradiation pattern 848 on the horizontal axis. Referring to FIG. 15B, light transmittances of the unit pixel are roughly proportional to widths of the domain boundary region pattern 840 and the second irradiation pattern 848. In other words, while the light transmittance is 5.24% for the width 3.5 μm of the second irradiation pattern 848, as the width increases to 5.0 μm and 6.5 μm, the light transmittance increases to 5.28% and 5.30%, respectively. Therefore, it may be appropriate that the second irradiation pattern 848 of the domain boundary region pattern 840 in the unit masking pattern 810 is wide.

However, the light transmittance for the width 6.5 μm of the second irradiation pattern 848 was 5.30%, which was the same as that of the reference unit masking pattern where the domain boundary region pattern 840 was 10.0 μm in width while the second irradiation pattern 848 does not exist. In addition, the light transmittance for the width 5.0 μm of the second irradiation pattern 848 is 5.28%, which is similar to 5.30% of the reference unit masking pattern. Therefore, it may be appropriate to set the width of the second irradiation pattern 848 of the domain boundary region pattern 840 to 6.5 μm. In addition, considering the case where the second irradiation pattern 848 showing excellent light transmittance is 5.0 μm thick, it may be appropriate to set the width of the second irradiation pattern 848 to 6.5±1.5 μm. Therefore, the width of the domain boundary region pattern 840 may be properly set to 13.0±3.0 μm, given that the first and second irradiation patterns 842 and 848 of the domain boundary region pattern 840 were the same in width.

The aforementioned unit pixel has an FFT partially along its edge in addition to the DBT. To reduce the FFT, a pretilt angle at the edge of the unit pixel may be increased by using a shape of a light blocking region of the unit masking pattern.

Figure 16A:
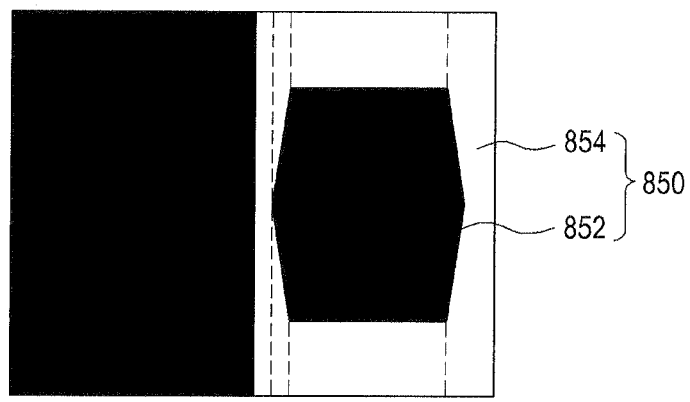
FIG. 16A is a plan view of a unit masking pattern to which a fringe field region pattern is applied to increase a pretilt angle at an edge of a unit pixel, according to an exemplary embodiment of the present invention.

FIG. 16A is a plan view of a unit masking pattern, to which a fringe field region pattern is applied to increase a pretilt angle at an edge of a unit pixel, according to an exemplary embodiment of the present invention. Referring to FIG. 16A, a fringe field region pattern 850 is formed at an edge of a unit masking pattern 810. The fringe field region pattern 850 is divided into a light blocking region 852 and a light transmission region 854, and a pretilt angle at the edge of the unit pixel may be increased by adjusting a ratio of areas of the two regions, contributing to reducing the fringe field region of the unit pixel. However, if the unit masking pattern 810 of FIG. 16A is applied, due to the alignment vectors of the domains, light transmittance increases at a part of one side of the unit pixel on which the fringe field region pattern 850 appears, while the light transmittance may reduce in the other parts of the side.

Figure 16B:
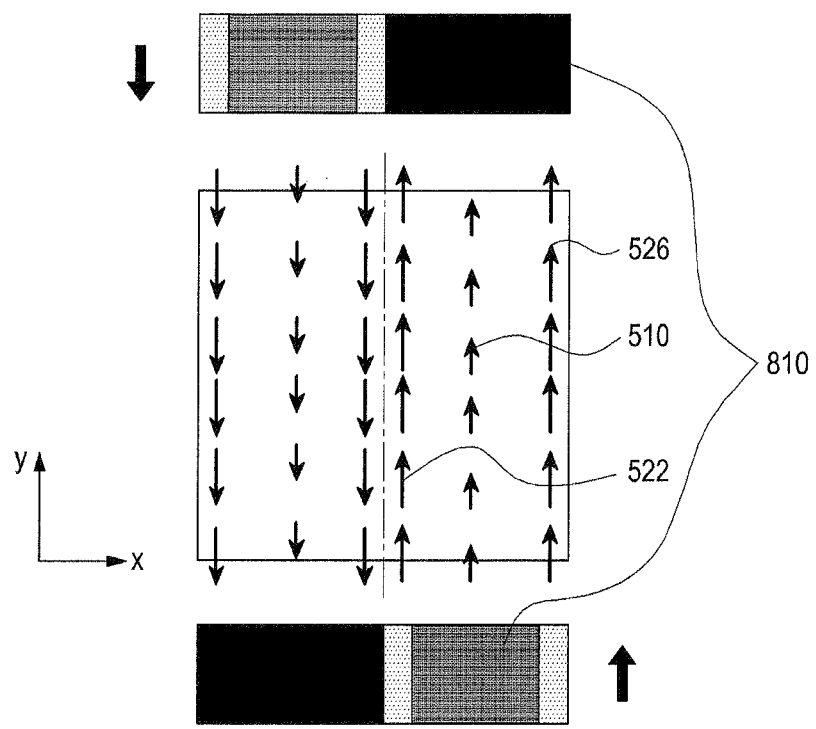
FIGS. 16B to 16D are diagrams showing alignment vectors of a unit pixel and a local change in light transmittance of the unit pixel, caused by the alignment vectors, when the unit masking pattern of FIG. 16A is applied to first and second substrates of the unit pixel.
Figure 16C:
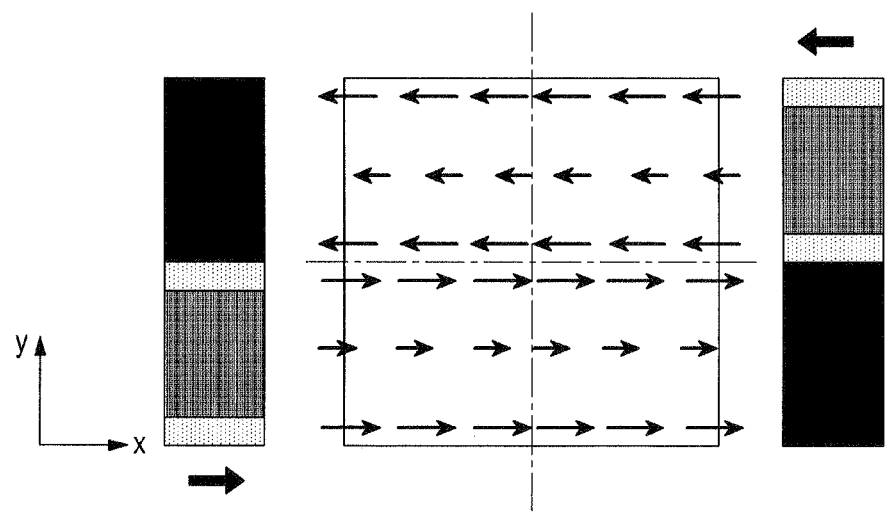
Figure 16D:
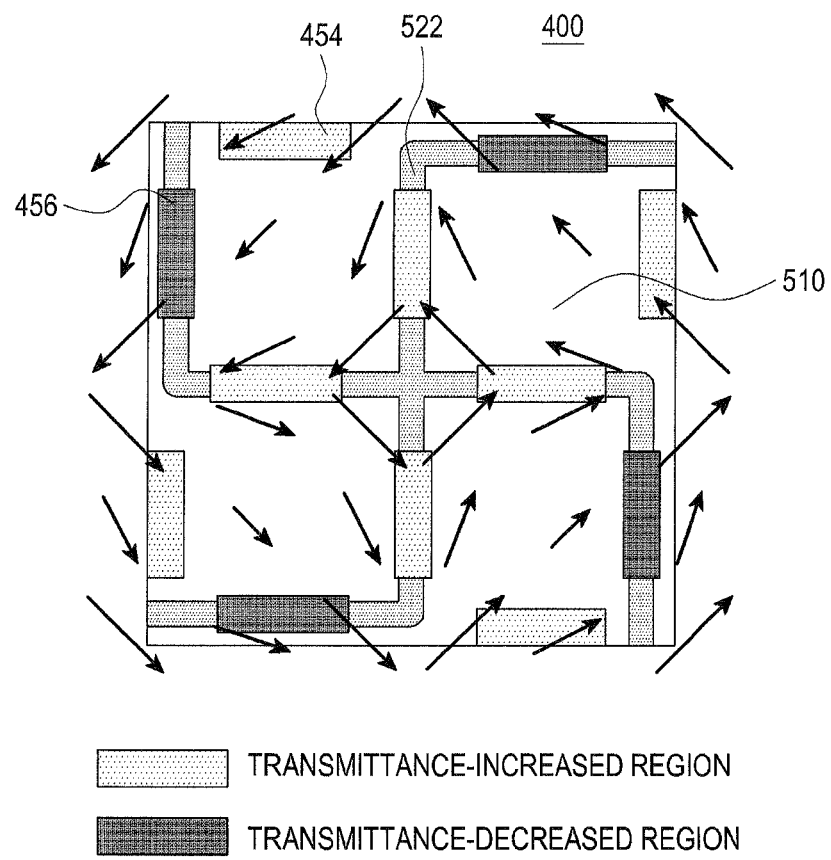

FIGS. 16B to 16D are diagrams showing alignment vectors of a unit pixel and a local light transmittance change of the unit pixel, caused by the alignment vectors, when the unit masking pattern 810 of FIG. 16A is applied to first and second substrates 100 and 200 of the unit pixel. According to FIGS. 16B to 16D, a light transmittance on a part of one side of the unit pixel increases, while that of the other part of the side decreases.

FIG. 16B is a diagram showing a pretilt angle which is made on an alignment film of the first substrate 100. The first substrate 100 is coated with an alignment film (not shown), to which the polarized UV light that passed through the unit masking patterns 810 of FIG. 16A is irradiated in two different directions parallel to the y-axis. Although the unit masking pattern 810 has the shape of FIG. 16A, it will be understood by those of ordinary skill in the art that the greater the energy of the light irradiated to a specific part on the substrate is, the brighter the part can be represented. Through this unit masking pattern 810, low-energy light is irradiated to the normal-luminance region 510 of the unit pixel on the first substrate 100, and high-energy light is irradiated to the DBT 522 and FFT 526.

FIG. 16C is a diagram showing a pretilt angle which is formed on an alignment film of the second substrate 200. Although the pretilt angle of the second substrate 200 is obtained by the same process and unit masking pattern as those used in FIG. 16B, the light is irradiated in two different directions parallel to the x-axis.

FIG. 16D is a plan view of a unit pixel 400, showing alignment vectors, DBTs and FFTs, which are formed according to the processes of FIGS. 16B and 16C. Referring to FIG. 16D, alignment vectors of each domain are different according to their specific locations. Specifically, an alignment vector of the normal-luminance region 510 in each domain has a smaller vector value than other locations in the same domain, forming a small pretilt angle and reducing a black afterimage.

On the other hand, the DBT 522 has a large vector value, increasing its light transmittance. However, in the FFT region, light transmittance does not increase despite an increase in the pretilt angle. To be specific, if the pretilt angle at the edge of the domain increases, more liquid crystal molecules depend on the pretilt angle, and thus, the number of liquid crystal molecules affected by the fringe field increases as well. As a result, the area of the FFT increases, and an area 456 occurs where light transmittance decreases. On the other hand, in a part where no fringe field is formed, at the edge of each domain, an area 454 occurs where light transmittance increases due to the increase in the pretilt angle of liquid crystal molecules.

In summary, owing to the process of using the unit masking pattern 810 of FIG. 16A, a part of the edge of the unit pixel 400 decreases in light transmittance, while the other parts of the edge increase in light transmittance. Therefore, for the part where light transmittance decreases, a structure of the unit pixel 400 may be changed.

Figure 17A:
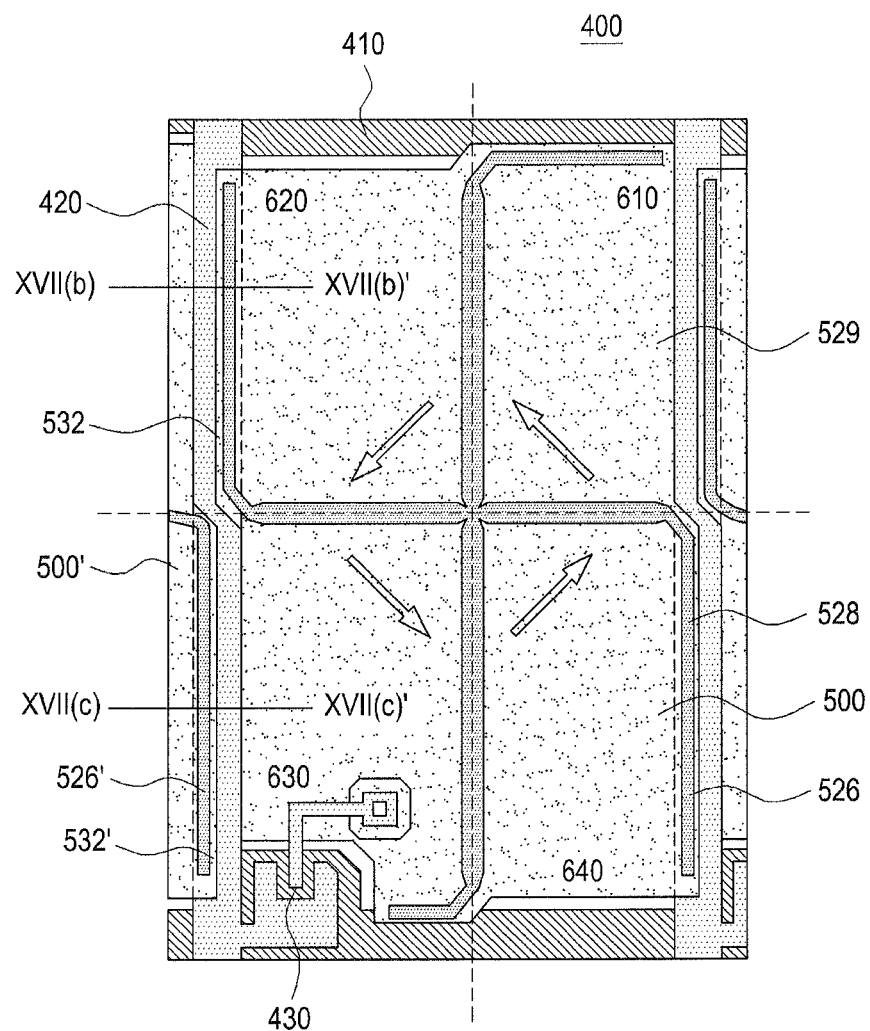
FIG. 17A is a plan view of a first substrate of a unit pixel in which a projection is formed at the edge of a pixel electrode and an FFT is formed on the projection, according to an exemplary embodiment of the present invention.

FIG. 17A is a plan view of a first substrate of a unit pixel where a projection is formed at an edge of a pixel electrode, on which an FFT occurs, according to an exemplary embodiment of the present invention. Referring to FIG. 17A, a pixel electrode and opaque wires of the unit pixel overlap the FFT, improving the aperture ratio and light transmittance of the unit pixel. A unit pixel 400 of FIG. 17A has a gate line 410 and a data line 420, both of which are made of an opaque material, and a pixel electrode 500 made of a transparent material. In particular, on the pixel electrode 500 are formed a plurality of domains 610, 620, 630 and 640, and FFTs 526.

The FFT 526 is partially formed at one edge of the pixel electrode 500. In other words, one edge of the pixel electrode 500 is divided into an FFT-formed region 528 and an FFT-unformed region 529. The FFT-formed region 528 is proportional to a pretilt angle of an alignment film. For example, use of the unit masking pattern 810 in FIG. 16A may increase the size of the FFT-formed region 528 and decrease light transmittance of the unit pixel 400. However, since the FFT 526 may also be formed with a low pretilt angle of the alignment film, it should be noted that the current embodiment of the present invention is not limited to a unit pixel that is manufactured using the unit masking pattern 810 with the fringe field region pattern 850, as shown in FIG. 16A.

The pixel electrode 500 of FIG. 17A has a projection 532 at the edge of the unit pixel 400 in an FFT-formed region 528. To be specific, according to exemplary embodiments of the present invention, projections 532 may alternately project from circumferences of four domains constituting the rectangular pixel electrode 500. In other words, one side of the pixel electrode 500 is divided into a part having the projection 532 and a part having no projection. Since the pixel electrode 500 has the projection 532, the unit pixel 400 is designed such that the FFT 526 located at the edge of the pixel electrode 500 is located on the projection 532. In addition, a thin film transistor 430 of the unit pixel 400 may be located on the projection 532.

The total area of the FFT 526 may be included in the projection 532. Since width of the FFT 526 is commonly measured as 60% of the DBT width, the projection 532 may project from the edge of the FFT-unformed region 529 by 60% or more of the DBT width. For example, if a width of the DBT is 10 μm, a width of the projection 532 is about 6 μm or more.

The projection 532 of the pixel electrode 500 may be extended to overlap opaque electrodes of the unit pixel 400. For example, as shown in FIG. 17A, a plurality of projections 532 may overlap the gate line 410 and the data line 420. In the alternative, the projection 532 of the pixel electrode 500 may selectively overlap any one of the gate line 410 and the data line 420. Since the gate line 410 and the data line 420 are formed of an opaque metal, the FFT 526 does not reduce light transmittance of the unit pixel 400. If the projection 532 formed in the unit pixel 400 is set to overlap opaque films in this way, the reduction in light transmittance may be lessened with variously directed alignment vectors of the unit pixel 400.

Figure 17B:
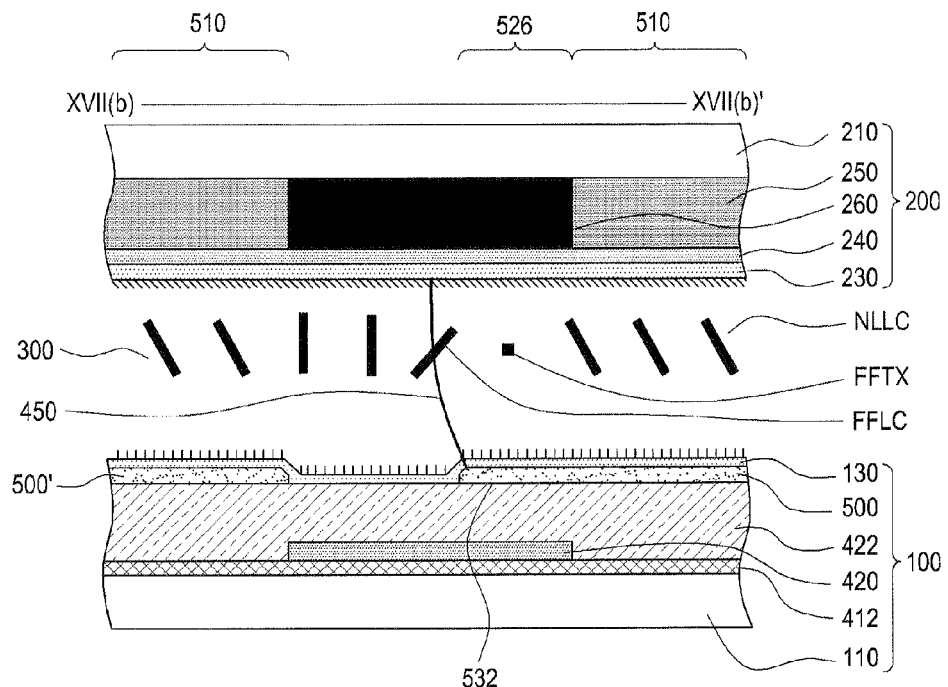
FIGS. 17B and 17C are, respectively, cross sectional views of the unit pixel of FIG. 17A taken along lines XVII(b)-XVII(b)' and XVII(c)-XVII(c)', which show examples in which the projection of the pixel electrode overlaps an FFT, a data line, and a black matrix.

FIG. 17B is a cross-sectional view of the unit pixel 400 taken along line XVII(b)-XVII(b)' of FIG. 17A, which shows an example in which the projection 532 of the pixel electrode 500 overlaps an FFT 526 and the data line 420. Referring to FIG. 17B, on the first substrate 100 are stacked in sequence a first base substrate 110, a gate insulating layer 412, the data line 420 made of a highly conductive opaque material, a data insulating layer 422, the pixel electrode 500 having the projection 532 overlapping the data line 420, and a first alignment film 130.

The second substrate 200 of FIG. 17B has a second base substrate 210, color filters 250 made of a material emitting a basic color of the unit pixels, a black matrix 260, a common electrode 240, and a second alignment film 230. The basic color of the color filters 250 may be any one of the three primary colors of red, green and blue, or any one of cyan, magenta and yellow. In the alternative, a color filter may be made empty to have the color of the backlight assembly, passing through the empty space, but set as a basic color.

Between the color filters 250 is arranged the black matrix 260, and on the color filters 250 and the black matrix 260 is arranged the common electrode 240 covering the entire surface of the second substrate 200. The second substrate 200 is fully covered with the common electrode 240, on which the second alignment film 230 having a specific pretilt angle is formed.

In FIG. 17B is shown an arrangement of liquid crystal molecules, which depend on both a fringe field 450 and pretilt angles of the first and second alignment films 130 and 230, in the middle of a liquid crystal layer 300. While liquid crystal molecules NLLC in the normal-luminance region 510 at the side XVIIb' of FIG. 17B are affected by the pretilt angle of the second alignment film 230, liquid crystal molecules FFLC at the edge of the pixel electrode 500 are affected by the fringe field 450 and tilted opposite to the liquid crystal molecules NLLC of the normal-luminance region 510. Therefore, FFT liquid crystal molecules FFTX are aligned in parallel or perpendicular to the polarization axes of a liquid crystal display panel, causing a low-luminance texture region.

An FFT 526 is situated on the projection 532 of the pixel electrode 500, which overlaps the data line 420 of the first substrate 100. The FFT 526 is not observed in the unit pixel 400, since the data line 420 is made of an opaque metal. The data line 420 is arranged outside the normal-luminance region 510 of the unit pixel 400, improving the aperture ratio and light transmittance of the unit pixel 400.

In the alternative, the FFT 526 may be arranged to overlap the black matrix 260 of the second substrate 200. The black matrix 260 is made of an opaque material such as an organic compound or a metal oxide and arranged between the color filters 250 to block light. Since the black matrix 260 is arranged outside the normal-luminance region 510 of the unit pixel 400 and the pixel electrode 500 has the projection 532 overlapping the black matrix 260 and the FFT 526, the aperture ratio light transmittance of the unit pixel 400 are improved.

On the other hand, as shown in FIG. 17A, a single data line 420 or single black matrix 260 may be arranged in common with the plural projections 532 and 532' of adjacent pixel electrodes 500 and 500'. In other words, the data line 420 overlapping the projection 532 shown on the line XVII(b)-XVII(b)' of FIG. 17A overlaps the projection 532' of the adjacent pixel electrode 500' and the FFT 526' located thereon, shown on line XVII(c)-XVII(c)' of FIG. 17A.

Figure 17C:
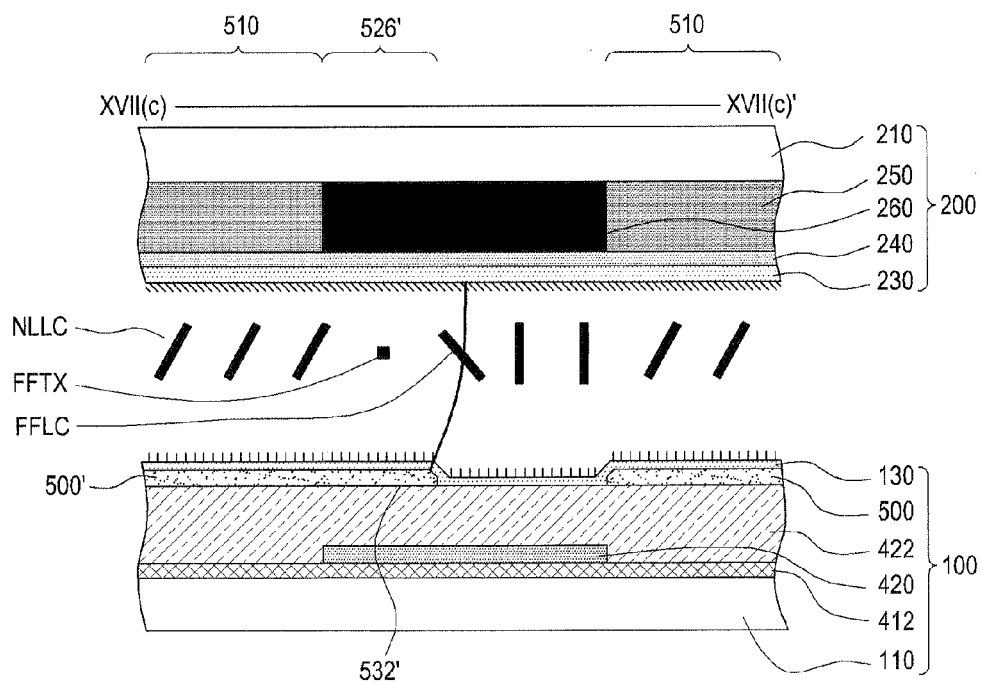

FIG. 17C is a cross-sectional view of the unit pixel 400 taken along the line XVII(c)-XVII(c)' of FIG. 17A, which shows an example in which the projection 532' and an FFT 526' of the unit pixel 500 overlap the data line 420 on the first substrate 100 and the black matrix 250 on the second substrate 200. Since a pretilt of the second alignment film 230 in FIG. 17C has a direction opposite to that of FIG. 17B, liquid crystal molecules are also all arranged in opposite directions.

However, FIG. 17C is the same as FIG. 17B in terms of the form in which the FFT 526' overlaps the data line 420 and the black matrix 260.

The data line 420 and the black matrix 260 in FIGS. 17B and 17C are extended straight along the edges of the pixel electrodes 500 and 500'. Therefore, the projections 532 and 532' of the two adjacent pixel electrodes 500 and 500' are alternately arranged along the data line 420. The straight extension of the data line 420 and the black matrix 260 contributes to a simpler liquid crystal display panel design.

In the foregoing description, the FFT 526 overlaps the data line 420 and/or the black matrix 260 using the projection 532 of the pixel electrode 500. However, the projection 532 may overlap the gate line 410 extending in a direction different from that of the data line 420, or a storage electrode 440 having a part partially overlapping the pixel electrode 500, according to an exemplary embodiment of the present invention. Unlike that shown in FIGS. 17A to 17C, the data line 420 and/or the gate line 410 may be made in accord with the overall shape of the pixel electrode 500. In addition, it will be understood by those of ordinary skill in the art that the projection 532 of the pixel electrode 500, which overlaps the opaque electrodes or black matrix of the unit pixel 400, may be formed all over one side of the pixel electrode 500.

Figure 18:
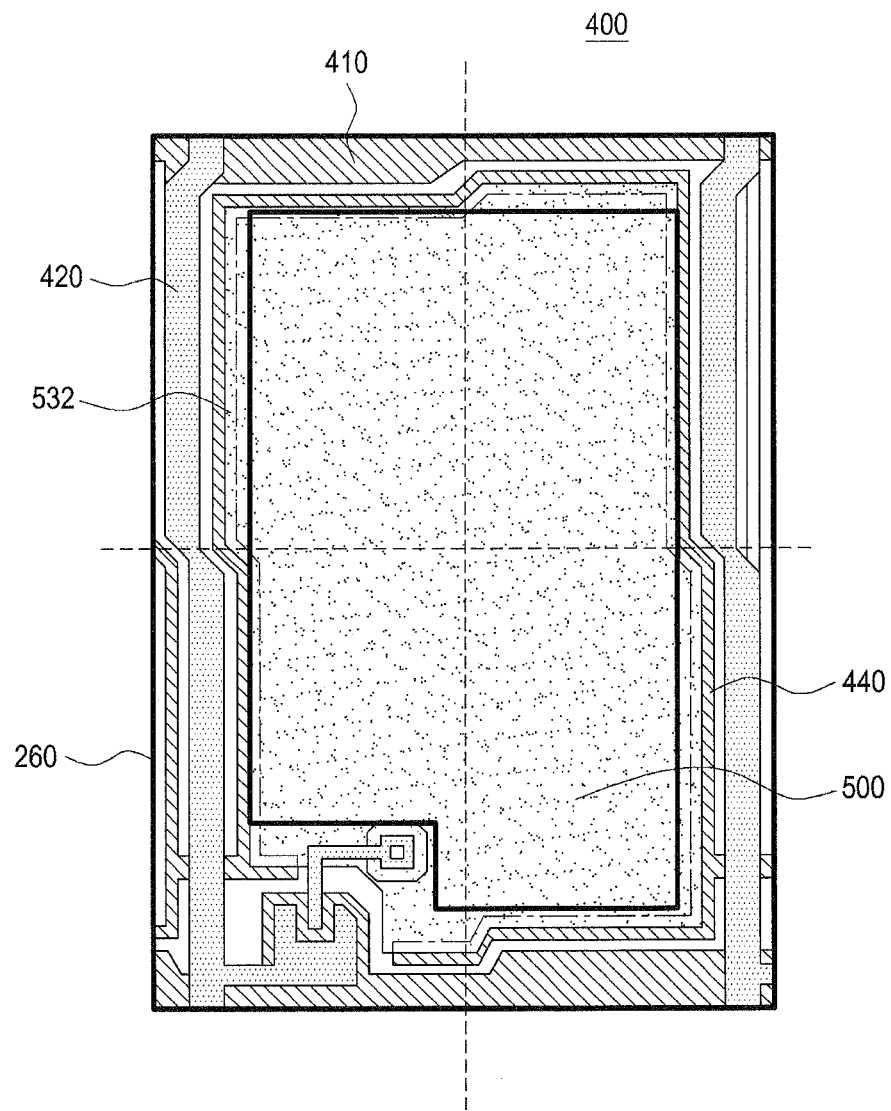
FIG. 18 is a partial plan view of a unit pixel, showing a data line and a storage electrode of the unit pixel bent in accord with an external shape of a pixel electrode and a black matrix extended straight, according to an exemplary embodiment of the present invention.

FIG. 18 is a partial plan view of a unit pixel, showing a data line and a storage electrode of the unit pixel running along the edge of a pixel electrode, and a black matrix, which is extended straight, according to an exemplary embodiment of the present invention. Referring to FIG. 18, a black matrix extending straight covers all of a projection of a unit pixel, other bent wires such as a data line, and an FFT, contributing to the improvement of the aperture ratio and light transmittance of the unit pixel and a simpler design thereof.

On the unit pixel 400 of FIG. 18 are represented a storage electrode 440 on a first substrate 100 and a black matrix 260 on a second substrate 200. Referring to FIG. 18, the storage electrode 440 is formed such that a part thereof overlaps the edge of a pixel electrode 500. For the storage electrode 440, its pixel potential is maintained for one frame. It will be understood by those of ordinary skill in the art that the storage electrode 440 partially overlaps the edge of the pixel electrode 500, since excessive overlapping between the storage electrode 440 and the pixel electrode 500 can reduce the aperture ratio and light transmittance of the unit pixel 400.

A data line 420 has a bending part similar in shape to the edges of the pixel electrodes, since it intervenes between two adjacent pixel electrodes. Therefore, the data line 420 of the unit pixel 400 in FIG. 18 has a bending part similar in shape to the pixel electrode 500 and the storage electrode 440.

The unit pixel 400 of FIG. 18 has the black matrix 260 that is extended straight on the second substrate 200. The black matrix 260, which is a region blocking the light, may overlap the wires, e.g., the gate line 410, data line 420 or storage electrode 440 on the first substrate 100, and the FFT shifted to the projection 532 of the pixel electrode 500. Therefore, the unit pixel 400 may be less affected by the FFT, increasing the aperture ratio and light transmittance of the unit pixel 400 and facilitating the simpler design of the unit pixel 400.

Figure 19A:
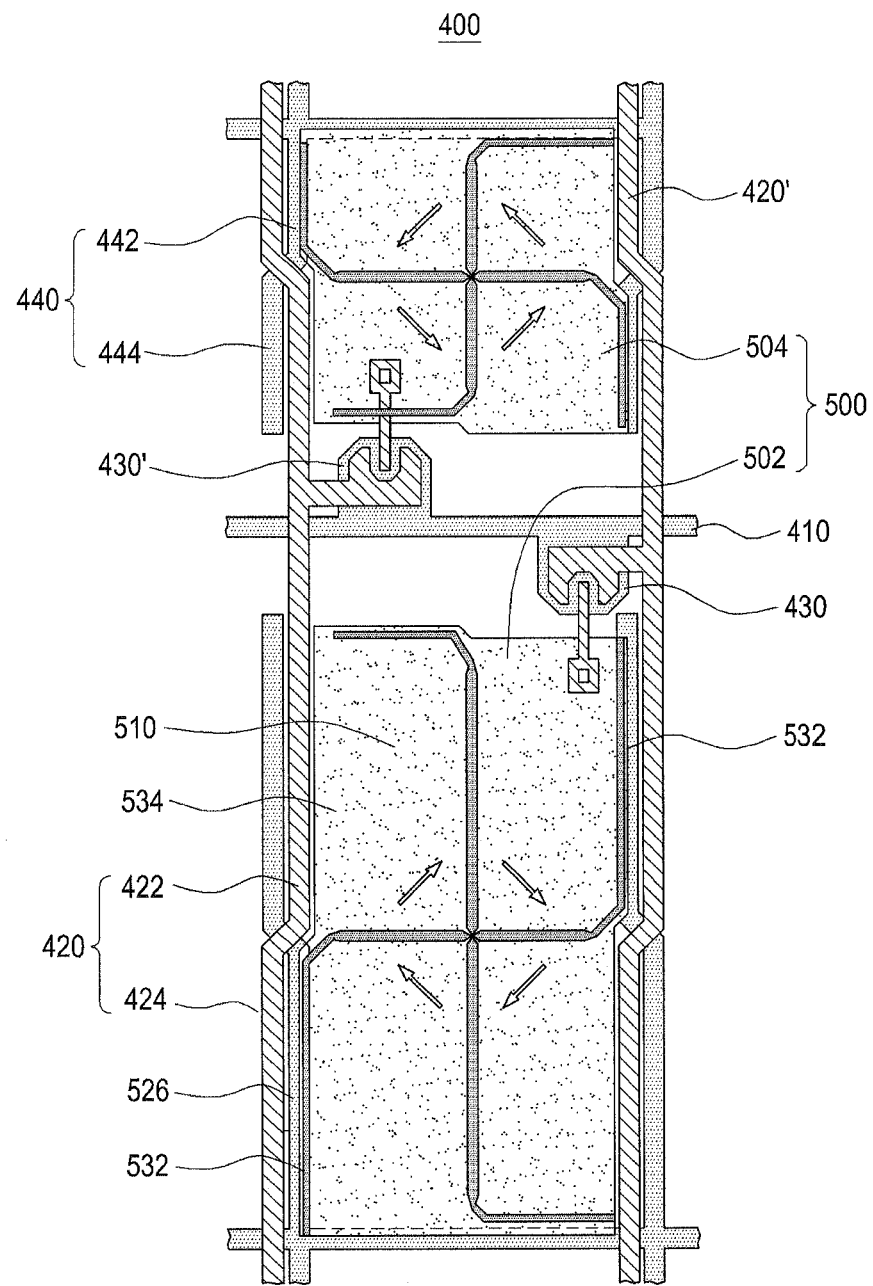
FIG. 19A is a plan view of a first substrate of a unit pixel with multiple pixel electrodes having projections, according to an exemplary embodiment of the present invention.

The projection 532 of the pixel electrode 500, which overlaps the FFT, may be applied to a unit pixel 400 having a plurality of pixel electrodes. FIG. 19A is a partial plan view of a unit pixel including a plurality of pixel electrodes which have projections. Referring to FIG. 19A, according to an exemplary embodiment of the present invention, a data line 420 and a storage electrode 440 of a unit pixel 400 cross each other in the vicinity of a region where a projection 532 and a recess 534 of a pixel electrode 500 meet. Herein, the recess 534 may be a part which is connectively formed to a projection 532 on one side of the pixel electrode 500. Alternatively, the recess 534 may be a non-projection part on one side of the pixel electrode 500.

In the unit pixel 400 of FIG. 19A, two pixel electrodes 502 and 504 are connected to one gate line 410 by two thin film transistors 430 and 430'. The thin film transistors 430 and 430' provide different voltages to the pixel electrodes 502 and 504, since they are connected to different data lines 420 and 420'. Therefore, liquid crystal molecules located on the pixel electrodes 502 and 504 are different in arrangement, making it possible to display a high-quality image that is not deformed even when a liquid crystal display panel is viewed from various directions.

In the alternative, the unit pixel 400 may have a transistor with two drain electrodes and an additional capacitor for a voltage drop. While one drain electrode is directly connected to the first pixel electrode 502, the other drain electrode is connected to the second pixel electrode 504 by way of the capacitor for the voltage drop. Accordingly, it will be understood by those of ordinary skill in the art that the two pixel electrodes 502 and 504 may form slightly different pixel potentials, improving the display quality of a liquid crystal display panel.

As described above, the pixel electrodes 500 are divided into the first pixel electrode 502 for receiving a relatively high voltage and the second pixel electrode 504 for receiving a relatively low voltage. The first and second pixel electrodes 502 and 504 have domains of different alignment vectors, each of which has projections 532 overlapping FFTs. The projections 532 overlap the storage electrode 440 as well, preventing the aperture ratio and light transmittance of the pixel electrodes 500 from deteriorating due to the FFTs.

The storage electrode 440 maintains a potential of the pixel electrode 500 by overlapping the edge of the pixel electrode 500. However, the full overlap of the storage electrode 440 with the pixel electrodes 500 leads to the overlap of a normal-luminance region 510 of the pixel electrode 500, causing a possible deterioration of the aperture ratio and light transmittance of the unit pixel 400. Thus, the storage electrode 440 overlaps the projection 532 of the pixel electrode 500, but does not overlap the non-projection part 534.

The data lines 420 and 420' are arranged along the edges of the pixel electrodes 500, maintaining a constant distance from the pixel electrodes 500 all over the unit pixel 400. On the other hand, the storage electrode 440 has a part overlapping the pixel electrode 500 and a part separated from the pixel electrode 500. To be specific, according to an exemplary embodiment of the present invention, the storage electrode 440 is spaced apart from the recess 534 while crossing the data lines 420 and 420', in the region where the projection 532 and the recess 534 of the pixel electrode 500 meet each other.

The data line 420 may be arranged in the space where the recess 534 and the storage electrode 440 are spaced apart from each other. In other words, in the vicinity of the recess 534 are arranged in sequence the pixel electrode 500, the data line 420 and the storage electrode 440. On the other hand, the data line 420 is arranged outside the storage electrode 440, since the projection 532 partially overlaps the storage electrode 440. In other words, in the vicinity of the projection 532 are arranged in sequence the pixel electrode 500, the storage electrode 440 and the data line 420.

According to the above structure, a projection 442 of the storage electrode 440, which overlaps the projection 532 of the pixel electrode 500 or a part thereof, and a recess 444 of the storage electrode 440, which is spaced apart from the recess 534 adjacent to the projection 532 of the pixel electrode 500, alternately cross a recess 424 and a projection 422 of the data line 420, which maintains a constant distance with the projection 532 and the recess 534 of the pixel electrode 500 on the whole, thereby preventing an increase in size of the unit pixel 400.

The first substrate 100 of the above-described unit pixel 400 is divided into a pixel region through which light passes, and a non-transmission region through which light does not pass. Fine metal wires are formed in the non-transmission region through which light does not pass, and on the second substrate 200 is formed the black matrix 260 covering the non-transmission region of the first substrate 100 since the display quality of a liquid crystal display panel may decrease due to the diffraction or reflection of the light by the metal wires.

FIG. 19B is a plan view of a second substrate of a unit pixel, on which a black matrix covering the non-transmission region of the unit pixel on a first substrate and a color filter representing a basic color of the unit pixel are formed. FIG. 19C is a plan view of a unit pixel obtained by assembling the first substrate of FIG. 19A and the second substrate of FIG. 19B. Referring to FIG. 19B, the black matrix 260 covers the wires 410, 420, 430 and 440, and the FFT 526 formed on the first substrate 100, surrounding the color filter 250. Referring to FIG. 19C, the unit pixel 400 displays a specific basic color as the light, which has passed through the first and second pixel electrodes 502 and 504 on the first substrate 100, passes through the color filter 250 on the second substrate 200. By covering the FFTs of the unit pixel 400, the black matrix 260 on the second substrate 200 may improve the display quality of a liquid crystal display panel and increase the light transmittance thereof.

In a unit pixel to which a photo-alignment process according to an exemplary embodiment of the present invention is applied, a pretilt angle of a domain boundary region is set greater than that of a normal-luminance region to reduce black afterimages, thereby improving the display quality of a liquid crystal display panel employing the unit pixel. Because of this pretilt angle configuration, the aperture ratio and light transmittance of the unit pixel improve, contributing to an increase in luminance and a reduction in power consumption. Further, since the unit pixel's storage electrodes and data lines may be arranged to cross each other, the size and light transmittance of such a unit pixel having multiple pixel electrodes are improved.

As is apparent from the foregoing description, a pretilt angle of the domain boundary region in each of the domains of a unit pixel can be set greater than a pretilt angle of the normal-luminance region, increasing the deviation between the arrangement of the liquid crystal molecules in the domain boundary region and the polarization axes. As a result, the width and area of the DBT decrease and the aperture ratio and light transmittance of the unit pixel increase.

The pretilt angle of the normal-luminance region is smaller than the pretilt angle of the domain boundary region. Therefore, liquid crystal molecules in the normal-luminance region depend on a pixel potential provided to the pixel electrode, reducing the black afterimage phenomenon. Hence, the liquid crystal display panel may have a further improved display quality.

A projection of the pixel electrode of the unit pixel can also overlap wires or a black matrix near the pixel electrode and an FFT formed on the projection may be hidden from the unit pixel, thereby improving the aperture ratio and light luminance of the unit pixel.

In addition, a shape of the black matrix and/or wires commonly overlapping the projections of adjacent pixel electrodes may not accord with the external shape of the pixel electrodes, facilitating a simpler design of the unit pixel and preventing an increase in size of the unit pixel.

As for a unit masking pattern for forming the unit pixel, according to an exemplary embodiment of the present invention, since light transmittance of the domain boundary region is higher than that of the normal-luminance region, a pretilt angle of the domain boundary region is greater than that of the normal-luminance region, thereby reducing the area and width of the DBT and improving the aperture ratio and light luminance of the unit pixel.

The unit masking pattern includes three specific patterns different in shape: a non-irradiation part pattern, a normal-luminance region pattern, and a domain boundary region pattern. Therefore, a unit pixel having a plurality of pretilt angles may be manufactured in a single process, thereby simplifying the photo-alignment process and saving manufacturing cost and time.

The pretilt angle of the domain boundary region is set large since a first irradiation part of the domain boundary region pattern of the unit masking pattern has no light blocking region. In addition, since a second irradiation part has a triangular-shaped light blocking region which gradually decreases in width, the pretilt angle of the domain boundary region adjacent to the normal-luminance region gradually increases, making it possible to stably control the alignment of liquid crystal molecules.

While the present invention has been shown and described with reference to exemplary embodiments thereof, it will be understood by those skilled in the art that various changes in form and details may be made therein without departing from the spirit and scope of the present invention as defined by the appended claims.

What is claimed is:

1. A liquid crystal display panel, comprising:
   a unit pixel comprising:
   a first substrate having a first alignment film, a second substrate having a second alignment film spaced apart from and facing the first alignment film, and a liquid crystal layer interposed between the first alignment film and the second alignment film; and
   first and second adjacent domains, each of which comprises a domain boundary region defining part of an area between the adjacent domains, and a normal-luminance region adjacent to the domain boundary region, wherein pretilt angles of liquid crystal molecules near the first alignment film in the domain boundary regions are greater than pretilt angles of liquid crystal molecules near the first alignment film in the normal-luminance regions,
   wherein an alignment vector of the first alignment film in one of the normal-luminance regions plus an alignment vector of the second alignment film is less than an alignment vector of the first alignment film in the domain boundary region adjacent to the one of the normal-luminance regions plus the alignment vector of the second alignment film.

2. The liquid crystal display panel of claim 1, wherein each of the domain boundary regions is greater than about 5.0 μm wide.

3. The liquid crystal display panel of claim 1, wherein pretilt angles of liquid crystal molecules in at least one of the domain boundary regions increase as the domain boundary region extends from a side of the domain boundary region adjacent to the normal-luminance region toward another side of the domain boundary region.

4. The liquid crystal display panel of claim 1, wherein pretilt angles of liquid crystal molecules in the domain boundary regions are greater than about 1.8°.

5. The liquid crystal display panel of claim 4, wherein pretilt angles of liquid crystal molecules in the normal-luminance regions are less than pretilt angles of the liquid crystal molecules in the domain boundary regions by about 0.2° or more.

6. The liquid crystal display panel of claim 1, wherein pretilt angles of liquid crystal molecules in the normal-luminance regions are less than pretilt angles of liquid crystal molecules in the domain boundary regions by about 0.2° or more.

7. The liquid crystal display panel of claim 1, wherein Domain Boundary Textures (DBTs) are formed in each of the domain boundary regions, and
   a sum of widths of the domain boundary regions between the adjacent domains is greater than a sum of widths of the DBTs between the adjacent domains.

8. The liquid crystal display of claim 1, wherein pretilt angles of liquid crystal molecules near the second alignment film in the domain boundary regions are greater than pretilt angles of liquid crystal molecules near the second alignment film in the normal luminance regions.

9. The liquid crystal display panel of claim 1, wherein alignment vectors of the normal-luminance regions are different from each other.

10. A liquid crystal display panel, comprising:
    a unit pixel comprising;
    a first alignment film formed on a first substrate and a second alignment film formed on a second substrate and facing the first alignment film; and
    a plurality of adjacent domains each of the adjacent domains comprising a normal-luminance region and domain boundary regions each domain boundary region defining part of an area between the adjacent domains,
    wherein a magnitude of a normal-luminance region alignment vector, which is obtained by adding an alignment vector of the first alignment film in a normal-luminance region to an alignment vector of the second alignment film, is less than a magnitude of a domain boundary region alignment vector, which is obtained by adding an alignment vector of the first alignment film in a domain boundary region adjacent to the normal-luminance region to the alignment vector of the second alignment film.

11. The liquid crystal display panel of claim 10, wherein the second alignment film has a first alignment vector and a second alignment vector, which face opposite directions, and the first alignment film has a third alignment vector and a fourth alignment vector, which are perpendicular to the first alignment vector and the second alignment vector, respectively, and face opposite directions, and
    the unit pixel has four different normal-luminance region alignment vectors determined from the first to fourth alignment vectors.

12. The liquid crystal display panel of claim 11, wherein the liquid crystal display panel further comprises a first polarizer and a second polarizer, the first and second polarizers having a first polarization axis and a second polarization axis, respectively, which cross the normal-luminance region alignment vectors at an angle of about 45°, and
    the domain boundary regions each have a Domain Boundary Texture (DBT) region having liquid crystal molecules arranged in parallel to the first polarization axis or the second polarization axis, and a luminance-improved region having liquid crystal molecules crossing the first polarization axis or the second polarization axis.

13. A liquid crystal display panel, comprising:
a unit pixel comprising:
a first domain, a second domain and a domain boundary region between the first and second domains,
wherein the domain boundary region includes a first domain boundary region as part of the first domain and a second domain boundary region as part of the second domain, the first and second domain boundary regions are adjacent to each other,
wherein the first domain includes a first normal-luminance region and the first domain boundary region includes a texture adjacent to the second domain boundary region and a luminance improved region adjacent to the first normal-luminance region,
wherein the first normal-luminance region has a luminance greater than a luminance of the texture and the luminance improved region has a luminance between the luminances of the first normal-luminance region and the texture,
wherein an alignment vector of the first domain boundary region is greater than an alignment vector of the first normal-luminance region.

14. The liquid crystal display panel of claim 13, wherein the alignment vector of the first normal-luminance region is different from an alignment vector of a second normal-luminance region of the second domain.

* * * * *